(12) United States Patent
Xiong et al.

(10) Patent No.: US 11,324,076 B2
(45) Date of Patent: May 3, 2022

(54) TRACKING REFERENCE SIGNALS FOR NEW RADIO

(71) Applicant: Apple Inc., Cupertino, CA (US)

(72) Inventors: Gang Xiong, Portland, OR (US); Ralf Bendlin, Cedar Park, TX (US); Alexei Davydov, Nizhny Novgorod (RU); Yushu Zhang, Beijing (CN); Sameer Pawar, Santa Clara, CA (US); Wook Bong Lee, San Jose, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/473,563

(22) PCT Filed: Mar. 22, 2018

(86) PCT No.: PCT/US2018/023890
§ 371 (c)(1),
(2) Date: Jun. 25, 2019

(87) PCT Pub. No.: WO2018/175813
PCT Pub. Date: Sep. 27, 2018

(65) Prior Publication Data
US 2020/0146107 A1    May 7, 2020

Related U.S. Application Data

(60) Provisional application No. 62/476,081, filed on Mar. 24, 2017.

(51) Int. Cl.
*H04W 88/06* (2009.01)
*H04W 76/27* (2018.01)
(Continued)

(52) U.S. Cl.
CPC .......... *H04W 88/06* (2013.01); *H04L 5/0051* (2013.01); *H04L 5/1469* (2013.01);
(Continued)

(58) Field of Classification Search
CPC ... H04W 88/06; H04W 76/27; H04W 56/001; H04W 68/005; H04W 72/042;
(Continued)

(56) References Cited

U.S. PATENT DOCUMENTS

2015/0103800 A1* 4/2015 Seo ............... H04W 48/16
370/330
2015/0334670 A1* 11/2015 Li .................. H04L 5/14
370/350
(Continued)

FOREIGN PATENT DOCUMENTS

WO    2016/198909 A1    12/2016

OTHER PUBLICATIONS

International Patent Office—International Search Report and Written Opinion dated Jun. 15, 2018, from International Application No. PCT/US2018/023890, 16 pages.
(Continued)

*Primary Examiner* — Ivan O Latorre
(74) *Attorney, Agent, or Firm* — Sterne Kessler Goldstein & Fox P.L.L.C.

(57) ABSTRACT

Embodiments include apparatuses, methods, and systems that may be used in a UE in a mobile communication network to communicate with a gNB. An apparatus may include a memory and processing circuitry coupled with the memory. The processing in circuitry may cause coarse time and frequency synchronization information, obtained from primary and secondary synchronization signals (PSS/SSS), to be stored in the memory. Based on the coarse time and frequency synchronization information, the processing cir-
(Continued)

400 —

401 — Transmitting, by primary and secondary synchronization signals (PSS/SSS), coarse time and frequency synchronization information to a user equipment (UE)

403 — Transmitting a first system information and a second system information to the UE 405 — Receiving a physical random access channel (PRACH) from the UE to trigger a transmission of a tracking reference signal (TRS) to the UE 407 — Transmitting the TRS to the UE cuitry may decode a physical broadcast channel to obtain a first system information, and may acquire a second system information based on the first system information. Based on the first and second system information, the processing circuitry may cause a transmission of a PRACH, to trigger a transmission of a TRS by the gNB. Other embodiments may also be described and claimed.

18 Claims, 20 Drawing Sheets

(51) Int. Cl.
      *H04L 5/00*       (2006.01)
      *H04L 5/14*       (2006.01)
      *H04L 27/26*       (2006.01)
      *H04W 56/00*       (2009.01)
      *H04W 68/00*       (2009.01)
      *H04W 72/04*       (2009.01)
      *H04W 74/08*       (2009.01)

(52) U.S. Cl.
      CPC ....... *H04L 27/2613* (2013.01); *H04W 56/001* (2013.01); *H04W 68/005* (2013.01); *H04W 72/042* (2013.01); *H04W 74/0833* (2013.01); *H04W 76/27* (2018.02)

(58) Field of Classification Search
      CPC ............. H04W 74/0833; H04L 5/0051; H04L 5/1469; H04L 27/2613
      See application file for complete search history.

(56) References Cited

U.S. PATENT DOCUMENTS

| | | | | |
|---|---|---|---|---|
| 2017/0303265 A1* | 10/2017 | Islam | .................... | H04B 7/088 |
| 2017/0347335 A1* | 11/2017 | Yi | ......................... | H04W 76/10 |
| 2018/0167946 A1* | 6/2018 | Si | ......................... | H04L 1/0061 |
| 2018/0199308 A1* | 7/2018 | Liu | ....................... | H04L 5/0048 |
| 2018/0279351 A1* | 9/2018 | Shimezawa | ........... | H04L 5/0092 |
| 2019/0058516 A1* | 2/2019 | Yang | .................... | H04B 7/0626 |
| 2019/0260530 A1* | 8/2019 | Yi | ......................... | H04L 5/0041 |

OTHER PUBLICATIONS

Interdigital Communication, "Acquisition of Other-SI," 3GPP TSG-RAN WG2 #95-BIS, R2-168464, Agenda Item: 9.2.2.2, Nov. 14-18, 2016, Reno Nevada, USA, 4 pages.

Ericsson, "On demand distribution of SI," 3GPP TSG-RAN WG2 #96, R2-168289, Agenda Item: 9.2.2.2-NR-CP-System Information, Nov. 14-18, 2016, Reno, Nevada, USA, 4 pages.

Samsung, "Discussion on fine time/frequency tracking for NR," 3GPP TSG RAN WG1 Meeting #88, R1-1702963, Agenda item: 8.1.2.4.6, Feb. 13-17, 2017, Athens, Greece, 4 pages.

3GPP, "Technical Specification Group Radio Access Network; Evolved Universal Terrestrial Radio Access (E-UTRA); Physical channels and modulation (Release 14)," 3GPP TS 36.211 V14.2.0 (Mar. 2017), Lte Advanced Pro, 196 pages.

International Preliminary Report on Patentability directed to related International Patent Application No. PCT/US2018/023890, dated Sep. 24, 2019; 8 pages.

* cited by examiner

|  | SS | DRS | TRS | CSI-RS | CSI-IM | DMRS |
|---|---|---|---|---|---|---|
| Sync | ▨ | | | | | |
| RRM | | ▨ | | | | |
| Tracking | | | ▨ | | | |
| OCL | | | | ▨ | | |
| CSI(H) | | | | ▨ | | |
| CSI($R_{nn}$) | | | | | ▨ | |
| Demod. | | | | | | ▨ |

▨ Always needed (RRC_IDLE, RRC_CONNECTED, activated SCell, deactivated SCell)
▨ Only needed when data is transmitted (non-casual)
▨ Only needed when data is transmitted (casual)

Figure 2

| RNTI | RRC_IDLE | RRC_CONNECTED |
|---|---|---|
| M-RNTI | ✓ | |
| SI-RNTI | ✓ | ✓ |
| P-RNTI | ✓ | ✓ |
| RA-RNTI | ✓ | |
| TPC-RNTI | | ✓ |
| eIMTA-RNTI | | ✓ |
| Temporary C-RNTI | ✓ | ✓ |
| C-RNTI & SPS C-RNTI | | ✓ |

▨ RAN aware of UE
▧ RAN unaware of UE

Figure 3

| Bandwidth of... | ...xTRS | ...before RRC Setup ACK | ...after RRC Setup ACK |
|---|---|---|---|
| Alt. 1 | Fixed (e.g., 6 PRBs) | Fixed (e.g., 6 PRBs) | UE-specific per RRC Config. |
| Alt. 2 | Configured per xMIB | Configured per xMIB | UE-specific per RRC Config. |
| Alt. 3 | Fixed (e.g., 6 PRBs) | Configured per xMIB | UE-specific per RRC Config. | xMIB acquisition → xSIB1 acquisition → xPRACH → RRCConnectionSetupComplete → Time

Figure 12

TRACKING REFERENCE SIGNALS FOR NEW RADIO

CROSS REFERENCE TO RELATED APPLICATIONS

The present application is a national phase entry under 35 U.S.C. § 371 of International Application No. PCT/US2018/023890, filed Mar. 22, 2018, entitled "TRACKING REFERENCE SIGNALS FOR NEW RADIO," which claims priority from U.S. Provisional Patent Application No. 62/476,081, filed Mar. 24, 2017, and entitled "LOW OVERHEAD TRACKING REFERENCE SIGNAL DESIGN FOR NR," the entire disclosures of which are hereby incorporated by reference.

TECHNICAL FIELD

Embodiments generally may relate to the field of wireless communications.

BACKGROUND

Long Term Evolution (LTE) networks may provide wireless communication to various user equipments (UEs). Multiple other wireless systems may provide similar wireless communications as well.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates further example reference signals including a TRS and the corresponding associated functions of a wireless network that includes a UE and a gNB, in accordance with various embodiments.

FIG. 3 illustrates example identifiers for a UE in a wireless network including the UE and a gNB, in accordance with various embodiments.

FIG. 12 illustrates a table summary of configured bandwidths allocations by a gNB to transmit a TRS to a UE, when a second UE is in communication with the gNB, in accordance with various embodiments.

DETAILED DESCRIPTION

Figure 1:
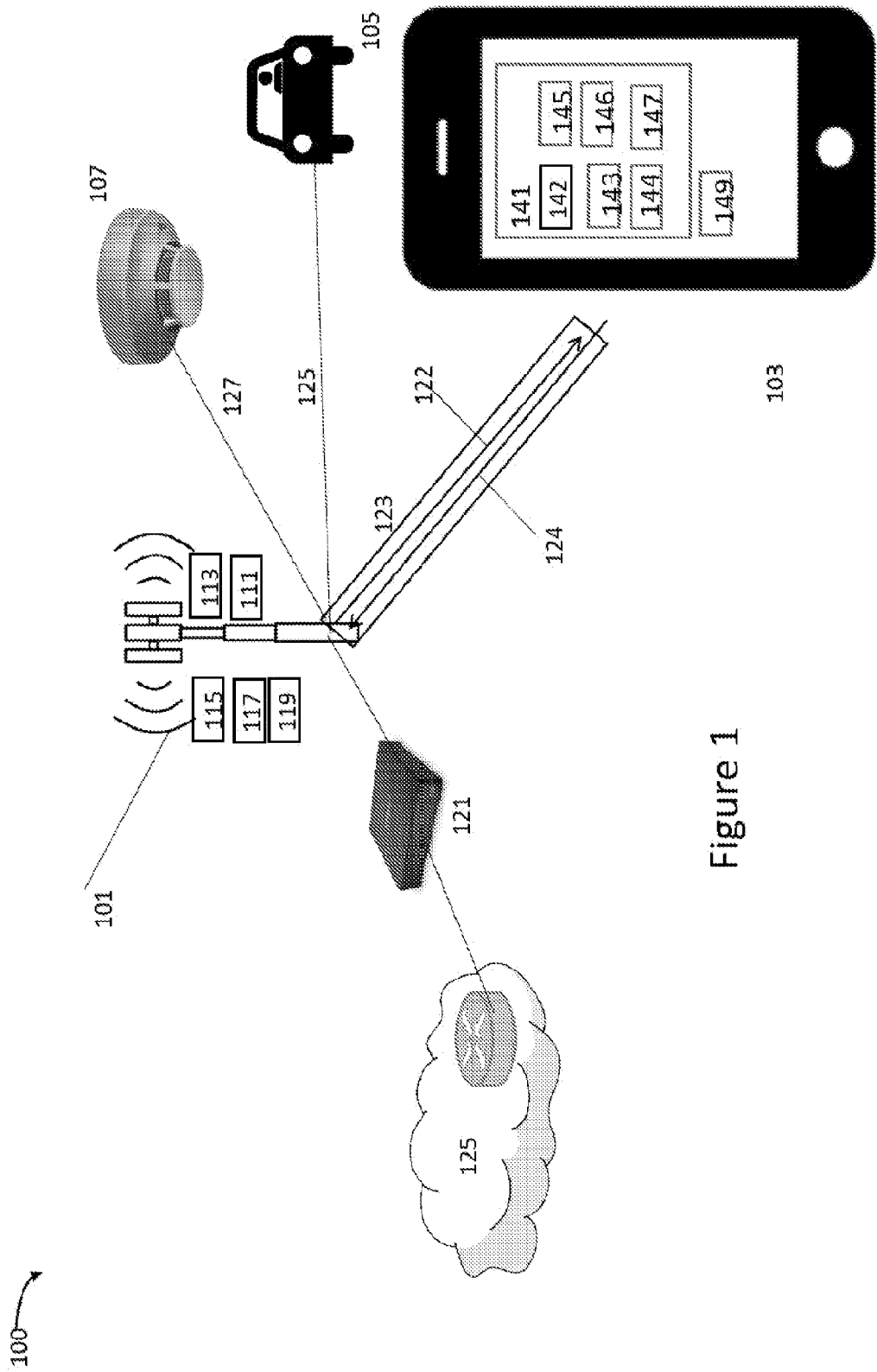
FIG. 1 illustrates a schematic high-level example of a wireless network that includes multiple user equipments (UEs), and a next generation Node B (gNB), where a UE may cause a transmission of a physical random access channel (PRACH) to trigger a transmission of a tracking reference signal (TRS) by the gNB, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

In the third generation partnership project (3GPP) long-term evolution (LTE) "fourth generation" mobile communications standard, base stations, so-called eNodeBs (eNB), may transmit cell-specific reference signal (CRS) in a periodic and load-agnostic fashion over a wideband. CRS may be presented in each downlink slot as it facilitates a user equipment (UE) to demodulate various channels, e.g., the physical downlink control channel (PDCCH), the physical hybrid automatic repeat reQuest (HARQ) indicator channel (PHICH), and the physical control format indicator channel (PCFICH). In addition, CRS may be used by a UE for other purposes, e.g., cell discovery and radio resource management (RRM) measurements to maintain time and frequency synchronization, fast Fourier transform (FFT) of the time-domain samples, automatic gain control prior to analog-to-digital conversion (ADC), or other system functions. Besides CRS, other reference signals, e.g., a UE-specific dedicated demodulation reference signals (DMRS), may be used to demodulate the physical downlink shared channel (PDSCH).

A next generation, e.g., the fifth generation (5G), wireless communications standard, which may also be referred to as new radio (NR), or next generation radio access technology (RAT), may provide a flexible PHYsical (PHY) layers air interface, with improved efficiency compared to the LTE standard. For example, in the NR, downlink channels may be transmitted with flexible bandwidth, low overhead, and dynamic duplex directions.

Embodiments herein may be applicable to LTE standard based elements, the NR based elements, or elements of other wireless systems. Although LTE elements and terms may be used throughout the following description, the embodiments discussed herein may be applicable to NR communications systems. Accordingly, the LTE elements/terms referenced herein may be replaced by the same or similar NR elements/terms. For example, functionality discussed with respect to an eNB in the LTE standard may be performed by a next generation nodeB (gNodeB or gNB). For another example, functions of the master information block (MIB) or system information blocks (SIBs) in LTE may be performed by minimum system information (MSI), remaining minimum system information (RMSI), or other system information (OSI) in NR. Furthermore, a subframe in the LTE may become a slot in NR.

On the other hand, the NR standard may improve some of the elements in the LTE standard in various ways. For example, a CRS in the LTE, which may be transmitted in a periodic, static, cell-specific, and load agnostic manner over a wideband, may not be efficient for an NR system. Embodiments herein may include a tracking reference signal (TRS), to be used in an NR RAT. Compared to a CRS, a TRS may carry different content for different functions, transmitted "on-demand" instead of being presented periodically in each downlink slot, and transmitted over different bandwidths instead of over a wideband. A TRS may be defined in a more flexible way, tailored towards singular functions, instead of "one size fits all" like the CRS in LTE. Hence, a TRS may assume some, but not all, of the aforementioned functionalities provisioned by the CRS in LTE. Moreover, instead of transmitted periodically in each downlink slot, a TRS may be transmitted by a gNB in response to a request/demand from a UE. A UE may transmit a physical random access channel (PRACH) to trigger the "on demand" transmissions of a TRS by a gNB. Alternatively, a gNB may start to transmit a TRS when downlink data, e.g., paging message data, may arrive in the medium access control (MAC) layer data buffer.

In detail, a UE may receive from a gNB a minimal set of system information, e.g., coarse time and frequency synchronization information, that may allow the UE to transmit a trigger, e.g., a PRACH transmission. A trigger may be a request from the UE for a TRS for certain functions. Upon reception of the trigger, the gNB may send a TRS to the UE. The UE may use the TRS to perform fine time and frequency synchronization. In addition, the UE may estimate a set of quasi-co-location (QCL) parameters of the physical propagation channel between the gNB transmitter and the UE receiver to tune its channel estimation circuitry and software programs.

Compared to a CRS, a TRS may have many advantages. For example, the information obtained through the TRS may allow the UE to receive data on the PDSCH with lower error probability and larger coding rate, resulting in significantly increased throughput metrics. The on-demand nature of the TRS may allow the network to control the overhead, bandwidth, and periodicity, amongst others, according to the load in the network. By allowing the UE to trigger the transmission of a TRS, energy savings and interference reduction, and hence improved spectral efficiency, may be achieved. Moreover, the embodiments discussed herein may provide different benefits for certain applications and deployments as detailed in the specification, e.g., for flexible duplex or flexible bandwidth communications systems.

In addition, a TRS in various embodiments herein may be different from other reference signals. For example, small cell eNBs may turn on and off their transceiver circuitry depending on the traffic load for both primary cells (PCells) or secondary cells (SCells). However, there is no lean carrier waveform in LTE-Advanced; rather, overhead can only be controlled by switching between no transmission and transmission of legacy waveforms, which are similar to a CRS. For example, an eNB in a PCell may turn off its radio front-end to achieve desired energy savings and interference reductions. However, when the PCell is active, the eNB may still transmit the cell-specific waveforms of a CRS periodically over a wideband. Similarly, for a deactivated SCell, an eNB may send discovery reference signals (DRS) whose transmission bandwidth and periodicity, amongst others, can be controlled via the radio resource control (RRC) protocol. However, when the SCell is activated, an eNB may still transmit the wideband periodic cell-specific waveforms of a CRS.

In embodiments, an apparatus may be used in a UE in a mobile communication network to communicate with a gNB. The apparatus may include a memory and processing circuitry coupled with the memory. The processing circuitry may cause coarse time and frequency synchronization information, obtained from primary and secondary synchronization signals (PSS/SSS), to be stored in the memory. Based on the coarse time and frequency synchronization information, the processing circuitry may decode a physical broadcast channel to obtain a first system information, and may acquire a second system information based on the first system information. Based on the first and second system information, the processing circuitry may cause a transmission of a PRACH, to trigger a transmission of a TRS by the gNB.

Some embodiments may include a computer-readable medium comprising instructions to cause a gNB, upon execution of the instructions by one or more processors, to transmit, by PSS/SSS, coarse time and frequency synchronization information to a UE. The gNB may be further caused to transmit a first system information and a second system information to the UE, and receive a PRACH from the UE to trigger a transmission of a TRS to the UE. In addition, the gNB may be further caused to transmit the TRS to the UE.

In embodiments, an apparatus to be used in a UE in a mobile communication network to communicate with a gNB may include various means. For example, the apparatus may include means for obtaining, from PSS/SSS, coarse time and frequency synchronization information; means for decoding, based on the coarse time and frequency synchronization information, a physical broadcast channel to obtain a MSI; means for acquiring, based on the MSI, one or more RMSI or OSI. The apparatus may further include means for causing a transmission of a PRACH, based on the MSI and the one or more RMSI and OSIs, to trigger a transmission of a TRS by the gNB.

For the purposes of the present disclosure, the phrases "A/B," "A or B," and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments, a module may be a distinct circuit, while in other embodiments a module may include a plurality of circuits.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or eNB, gNB, base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates a schematic high-level example of a wireless network 100 that includes multiple UEs, e.g., a UE 103 that may be a smartphone, a UE 105 that may be an onboard vehicle system, a UE 107 that may be a sensor, and a gNB, e.g., a gNB 101, where the UE 103 may cause a transmission of a PRACH to trigger a transmission of a TRS, e.g., a first TRS 117 by the gNB 101, in accordance with various embodiments. For clarity, features of a UE, a gNB, or a TRS, e.g., the UE 103, the UE 105, the UE 107, the gNB 101, and the first TRS 117, may be described below as examples for understanding an example UE, a gNB, or a TRS. It is to be understood that there may be more or fewer components within a UE, a gNB, or a TRS. Further, it is to be understood that one or more of the components within a UE, a gNB, or a TRS, may include additional and/or varying features from the description below, and may include any device that one having ordinary skill in the art would consider and/or refer to as a UE, a gNB, or a TRS.

In embodiments, the wireless system 100 may include multiple UEs, e.g., the UE 103, the UE 105, the UE 107, and the gNB 101 operating over a physical resource of a medium, e.g., a medium 123, a medium 125, a medium 127, or other medium. In embodiments, a UE, e.g., the UE 103, may be an IoT UE, a MTC UE, a M2M UE, or any other UEs. A medium, e.g., the medium 123, may include a downlink 122 and an uplink 124. The gNB 101 may be coupled to a core network 125. In some embodiments, the core network 125 may be coupled to the gNB 101 through a wireless communication router 121.

The RRC protocol, which is an IP level protocol, may be used on the air interface between the gNB 101 and the UE 103, over the medium 123. The major functions of the RRC protocol may include connection establishment and release functions, broadcast of system information, radio bearer establishment, reconfiguration and release, paging notification, and release and outer loop power control. By means of the signaling function, the RRC may configure the user and control planes according to the network status and allow for radio resource management strategies to be implemented. The wireless system 100 may have three RRC states, e.g., RRC_CONNECTED, RRC_IDLE, and RRC Inactive state. Other RRC states may exist for other wireless systems, e.g., RRC_Setup. Embodiments herein may be applicable to the UE 103 in a RRC_CONNECTED, RRC_IDLE, and RRC Inactive state, among other states.

In embodiments, the gNB 101 may determine or generate a coarse time and frequency synchronization information 111, a first system information 113, a second system information 115, a first TRS 117, and a second TRS 119. The coarse time and frequency synchronization information 111 may be transmitted to the UE 103 by PSS/SSS. In some embodiments, the first system information 113 may be included in a MIB and the second system information 115 may be included in one or more SIBs. In some embodiments, the first system information 113 may be MSI and the second system information 115 may be RMSI or OSI. The first TRS 117 may be transmitted to the UE 103 when the gNB 101 may receive a PRACH from the UE 103 to trigger a transmission. On the other hand, the second TRS 119 may be transmitted to the UE 103 for a paging message, independently from the PRACH received from the UE 103.

Figure 4:
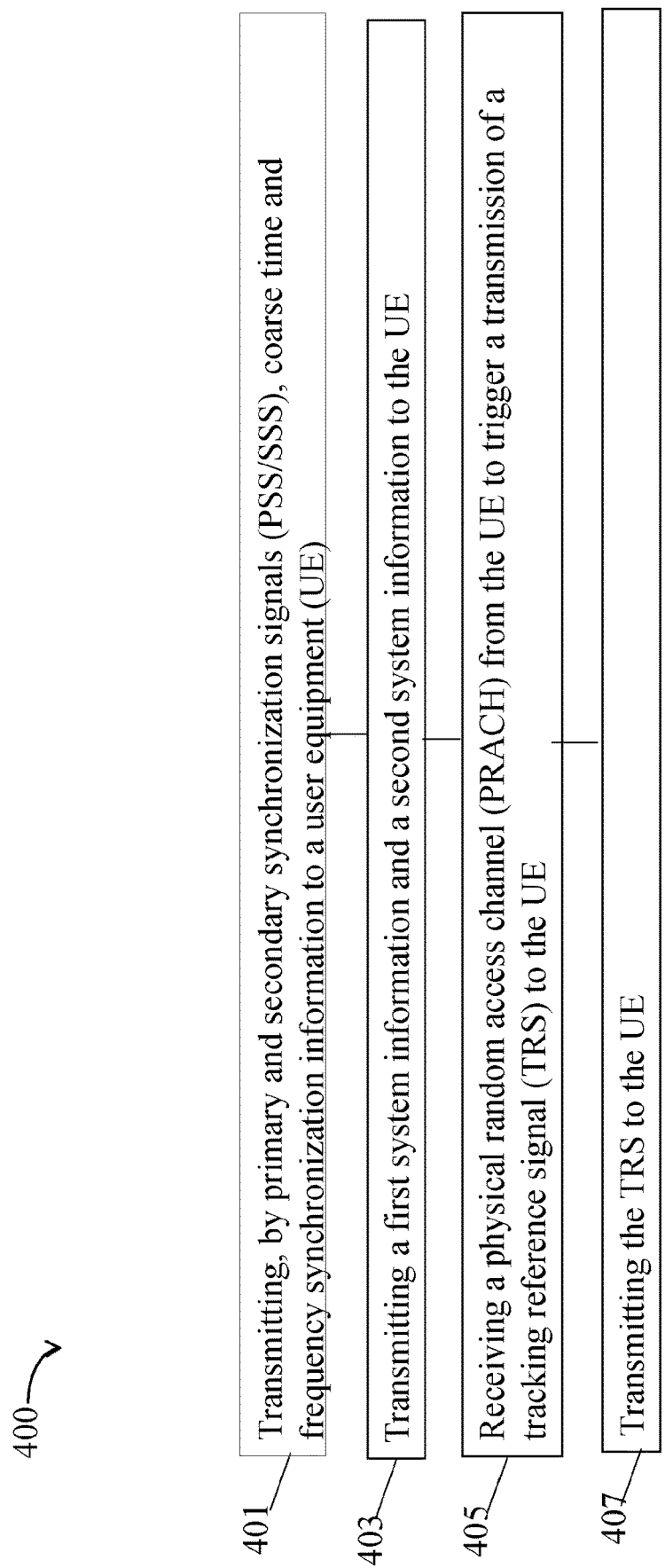
FIG. 4 illustrates an example process for a gNB to transmit a TRS to a UE, triggered by a PRACH received from the UE, in accordance with various embodiments.
Figure 7:
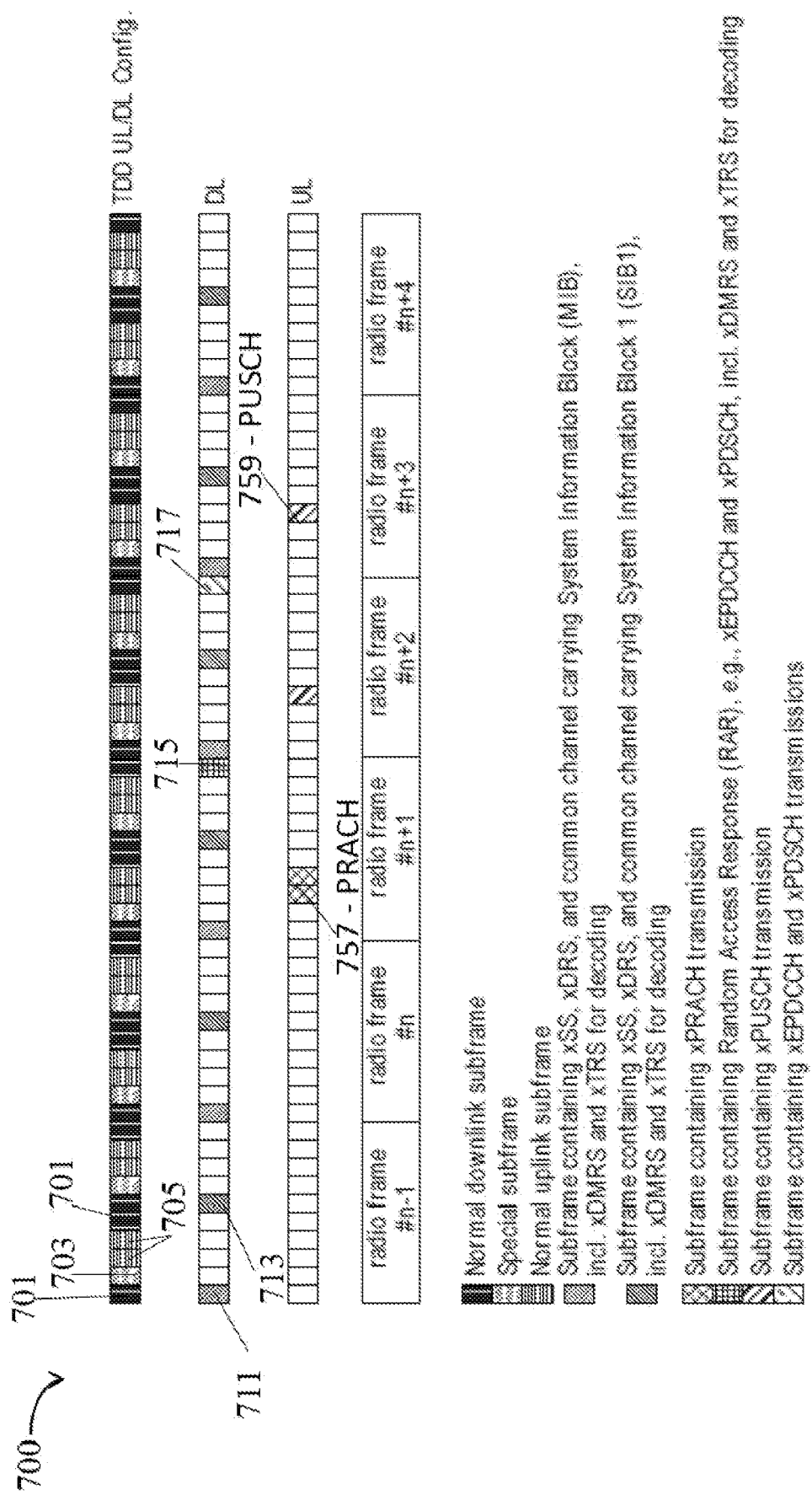
FIG. 7 illustrates an example diagram of uplink and downlink frames demonstrating operations between a UE and a gNB for a transmission of a TRS, in accordance with various embodiments.

In embodiments, the gNB 101 may be implemented by devices including one or more processors, as shown in FIG. 15, FIG. 16, FIG. 17, or FIG. 20, to perform various operations, e.g., operations outlined in FIG. 4 or FIG. 7. A computer-readable medium may include instructions to cause the gNB 101, upon execution of the instructions by one or more processors, to transmit the coarse time and frequency synchronization information 111 to the UE 103. The coarse time and frequency synchronization information 111 may be transmitted by PSS/SSS. The gNB 101 may further be caused to transmit the first system information 113 and the second system information 115 to the UE103, receive a PRACH from the UE 103 to trigger a transmission of the first TRS 117 to the UE 103, and further transmit the first TRS 117 to the UE 103. The first TRS 117 may be transmitted periodically after receiving the PRACH from the UE, while the PRACH may trigger a starting point of the first TRS 117.

Figure 8:
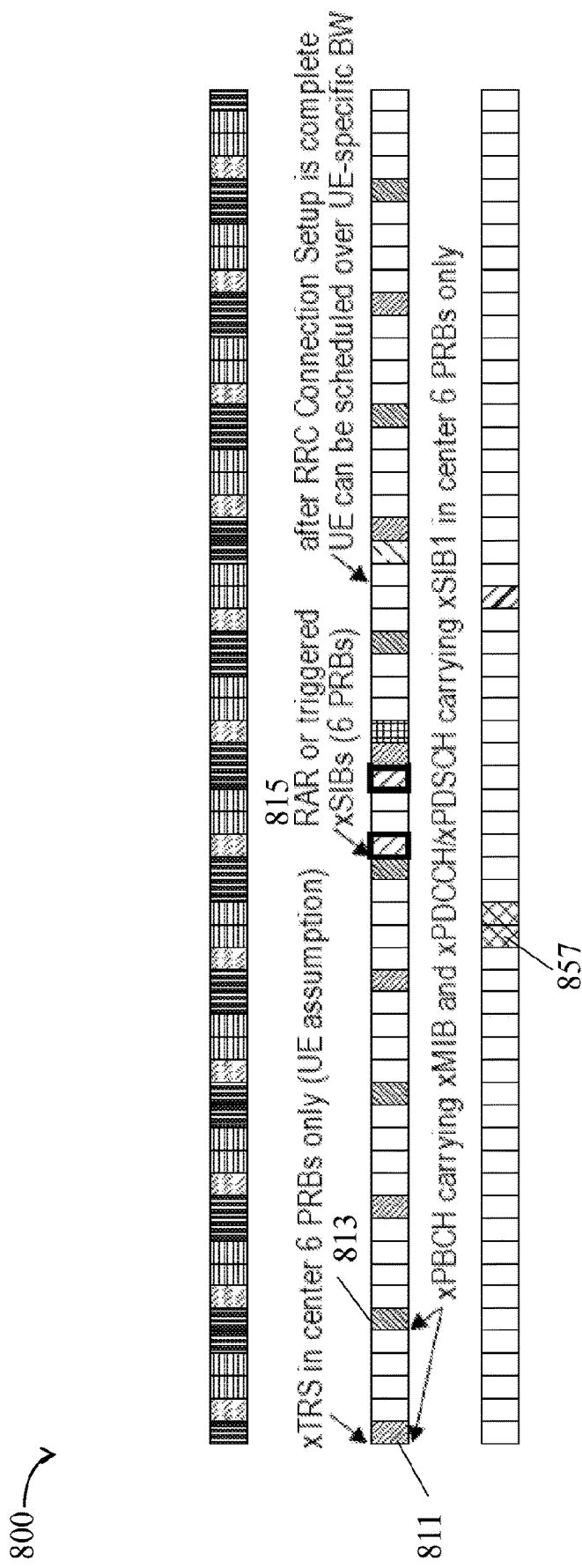
FIGS. 8-10 illustrate various example diagrams of uplink and downlink frames demonstrating operations between a UE and a gNB for a transmission of a TRS over various bandwidth, in accordance with various embodiments.
Figure 9:
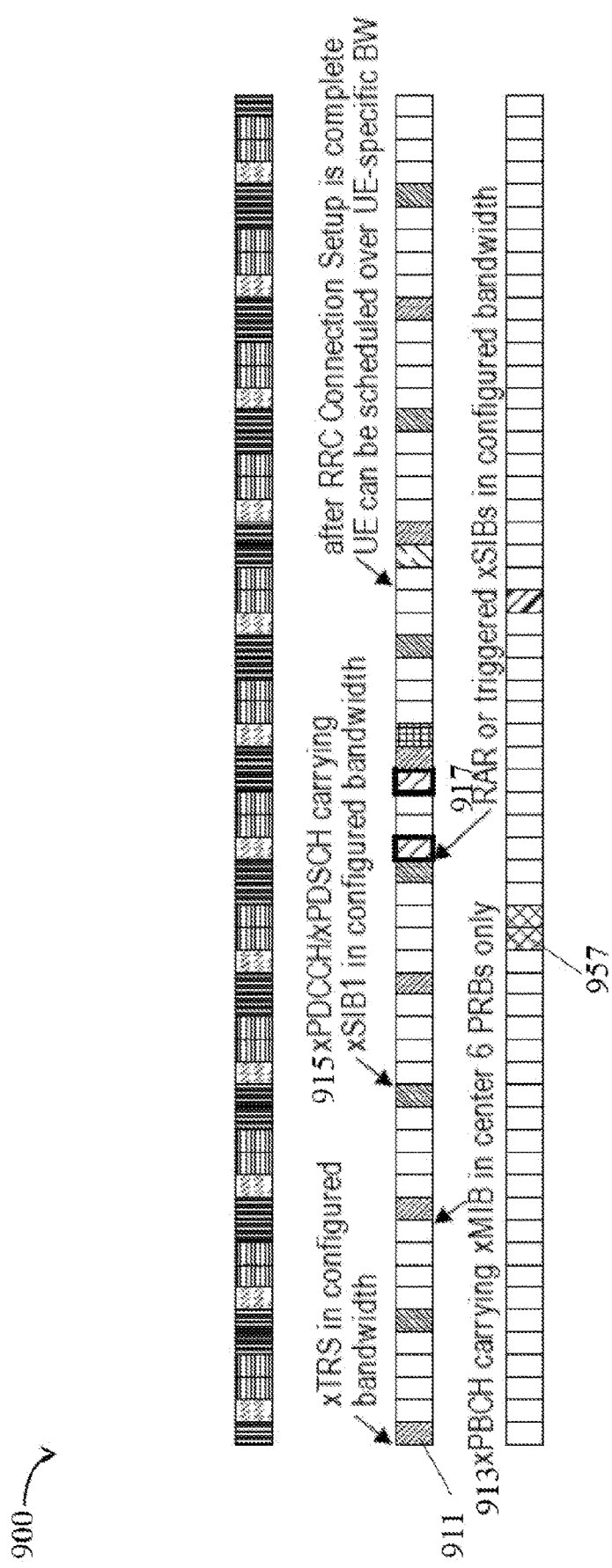
Figure 10:
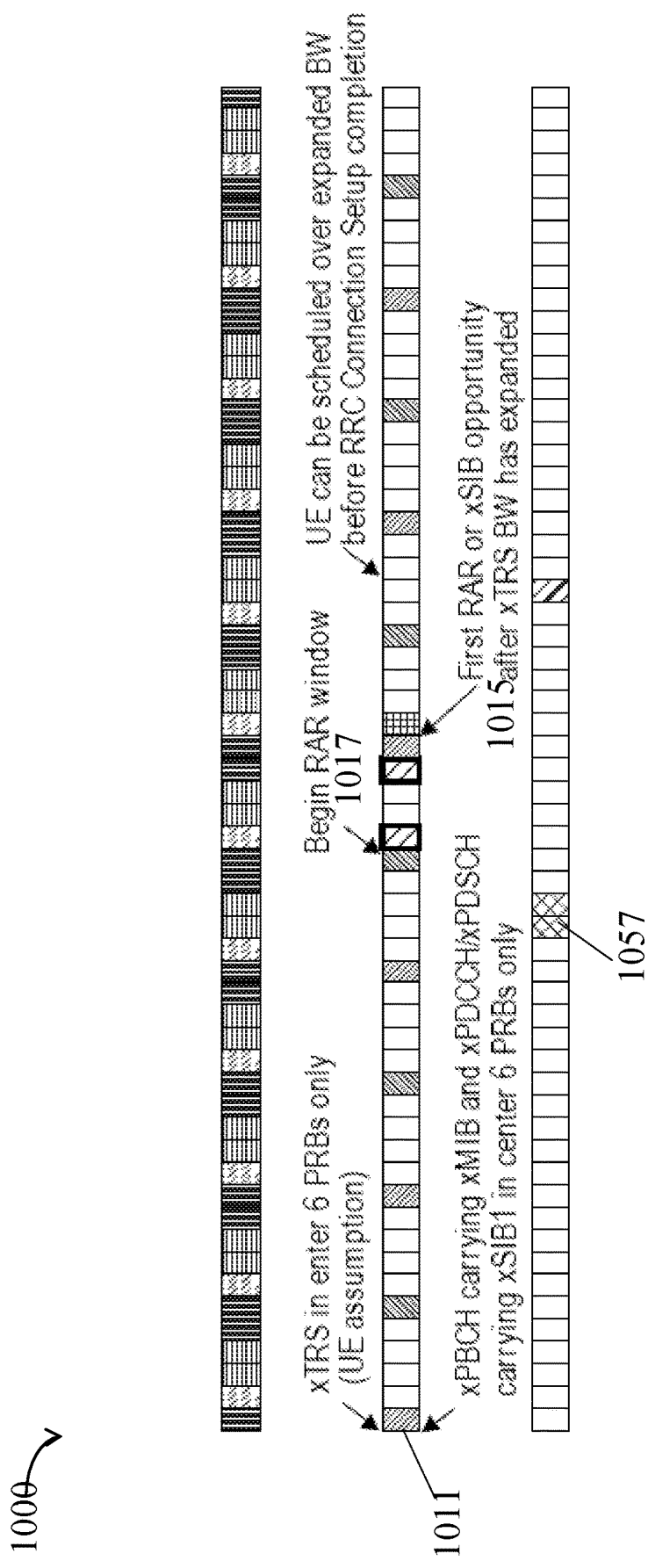

In embodiments, the first system information 113, the second system information 115, and the first TRS 117 may be transmitted in various bandwidth configurations, e.g., as shown in FIGS. 8-10. For example, the first system information 113, the second system information 115, and the first TRS 117 may be transmitted over a same bandwidth. Alternatively, the first system information 113 and the second system information 115 may be transmitted over a first bandwidth, and the first TRS 117 may be transmitted over a second bandwidth that is larger than the first bandwidth. In addition, the gNB 101 may further be caused to transmit the second TRS 119 for a paging message to the UE 103, when a paging message may arrive in the MAC layer data buffer.

In embodiments, the UE 103 may include a memory 141, and processing circuitry 149 coupled with the memory 141. The memory 141 may include a coarse time and frequency synchronization information 142, a first system information 143, a second system information 144, a first TRS 145, a second TRS 146, and one or more identifiers 147 related to the UE 103. The elements stored in the memory 141 may be presented for examples only, and are not limiting. For example, more reference signals in addition to the first TRS 145 or the second TRS 146 may be stored in the memory 141. More details of reference signals may be shown in FIG. 2. More details of the one or more identifiers 147 may be shown in FIG. 3.

The coarse time and frequency synchronization information 111 in the gNB 101 may be transmitted to the UE 103 to become the coarse time and frequency synchronization information 142 in the UE 103. Similarly, the first system information 113, the second system information 115, the first TRS 117, and the second TRS 119 in the gNB 101 may be transmitted to the UE 103 to become the first system information 143, the second system information 144, the first TRS 145, and the second TRS 146, respectively. The one or more identifiers 147 related to the UE 103 may be determined by the gNB 101 as well. In some embodiments, the first system information 143 may be transmitted to the UE 103 by a MIB and the second system information 144 may be transmitted to the UE 103 in one or more SIBs. In some other embodiments, the first system information 143 may be transmitted to the UE 103 in MSI and the second system information 144 may be transmitted to the UE 103 in RMSI or OSI. The UE 103 may transmit a PRACH to the gNB 101 to trigger the gNB 101 to transmit the first TRS 145. On the other hand, the second TRS 146 may be transmitted to the UE 103 for a paging message, independently from the PRACH transmitted by the UE 103.

Figure 5:
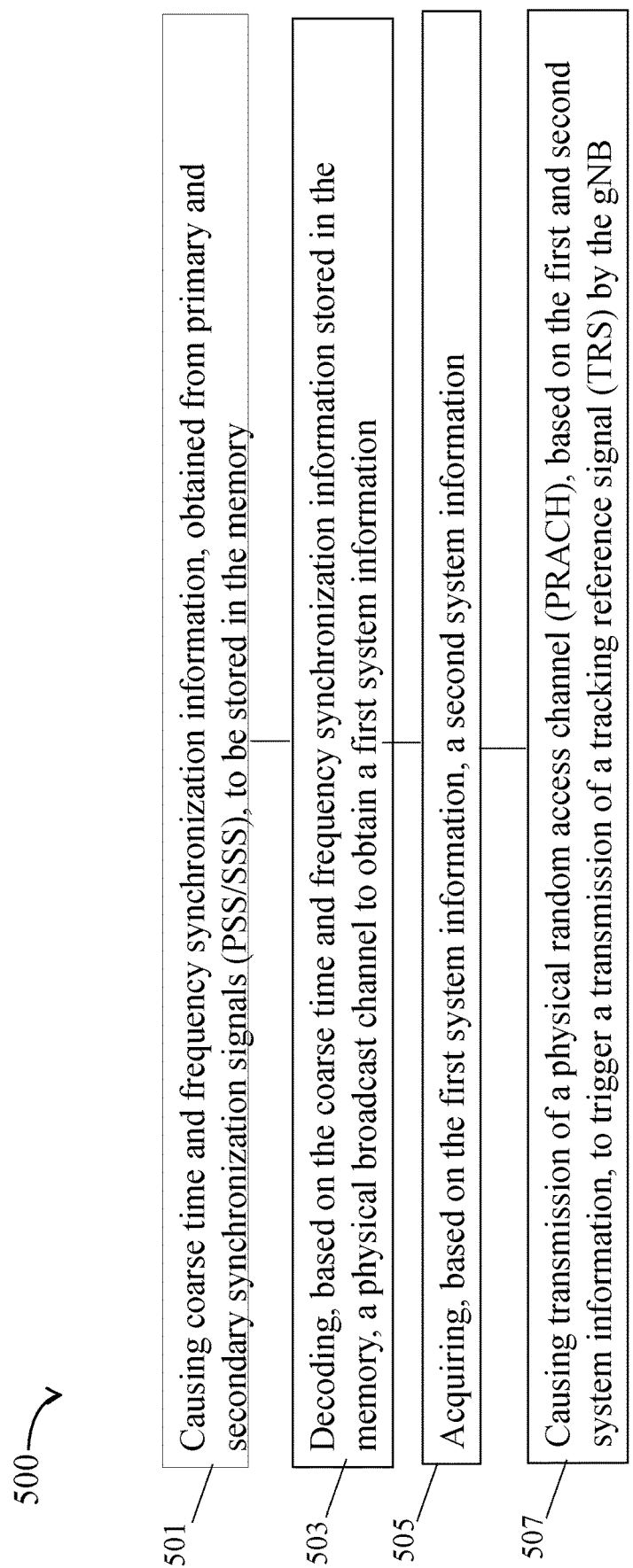
FIG. 5 illustrates an example process for a UE to cause a transmission of a PRACH to trigger a transmission of a TRS by the gNB, in accordance with various embodiments.
Figure 6:
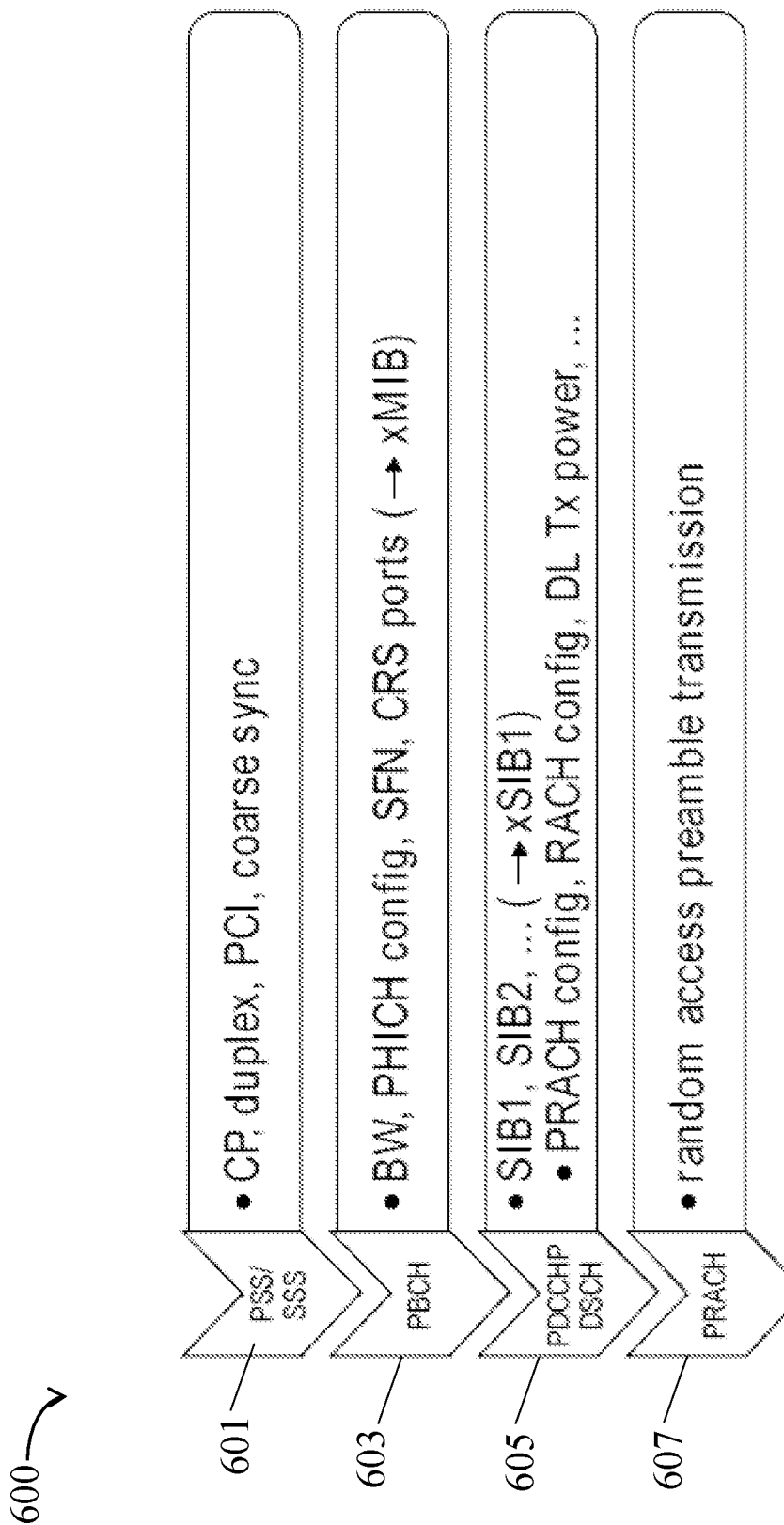
FIG. 6 illustrates another example process for a UE to cause a transmission of a PRACH to trigger a transmission of a TRS by the gNB, in accordance with various embodiments.

In embodiments, the UE 103 may be implemented by devices including one or more processors to implement the processing circuitry 149, as shown in FIG. 15, FIG. 16, FIG. 17, or FIG. 20, to perform various operations, e.g., operations outlined in FIG. 5, FIG. 6, or FIG. 7. In embodiments, the processing circuitry 149 may cause the coarse time and frequency synchronization information 142 to be stored in the memory 141. The processing circuitry 149 may decode, based on the coarse time and frequency synchronization information 142 stored in the memory 401, a physical broadcast channel to obtain the first system information 143, and acquire the second system information 144 based on the first system information 143. Furthermore, the processing circuitry 149 may cause transmission of a PRACH, based on the first system information 143 and the second system information 144, to trigger a transmission of a TRS, e.g., the first TRS 117 by the gNB 101. The PRACH may trigger periodic transmissions of the first TRS 117 by the gNB 101. The processing circuitry 149 may identify the first TRS 145 from the gNB 101. Based on the first TRS 145, the processing circuitry 149 may perform fine time and frequency synchronization with the gNB 101, where the fine time and frequency synchronization is more accurate than the coarse time and frequency synchronization information 142.

Other operations may be performed based on the first TRS 145. For example, the processing circuitry 149 may obtain downlink control information (DCI) carried by PDCCH, to schedule PDSCH that is to carry the system information, and estimate, based on the first TRS 145, a set of QCL parameters of a channel between the gNB 101 and the UE 103. Furthermore, the processing circuitry 149 may determine, based the first system information 143 and the second system information 144, a configuration of cell-specific bandwidth over which the first TRS 145 may be received.

In embodiments, the first TRS 145 may be received over various bandwidths following different configurations, as shown in FIGS. 8-10. For example, the first TRS 145 may be received over a same bandwidth the first system information 143 and the second system information 144 are received. The same bandwidth may include a same number of physical resource blocks (PRBs) over which the PSS/SSS are transmitted when the gNB 101 may be in an energy-savings mode. In some other embodiments, the first system information 143 and the second system information 144 may be received over a first bandwidth and the first TRS 145 may be received over a second bandwidth that is larger than the first bandwidth. Furthermore, the first TRS 145 may be received over a UE-specific bandwidth configured by RRC signaling after RRC connection setup. In detail, the first TRS 145 may be received in a downlink slot in a time division duplex (TDD) system, and wherein the slot is defined by a mathematical formula, or by interleaved orthogonal frequency-division multiple Access (OFDMA) signal structure.

In embodiments, the processing circuitry 149 may identify the second TRS 146 for a paging message from the gNB 101 that is sent independent from the transmission of the PRACH. The second TRS 146 for the paging message may be received in a same system bandwidth over which the first system information 143 and the second system information 144 may be received, or in a configurable cell-specific bandwidth or UE specific bandwidth. The second TRS 146 for the paging message may be received periodically in a fixed specified narrowband bandwidth.

In some embodiments, the medium 123 may be a narrowband channel with a bandwidth of 180 kHz or 200 kHz. In some other embodiments, the medium 123 may be a band in any frequency range (in particular 0 Hz-300 GHz), such as for example unlicensed bands (as the 5 GHz ISM band) or the licensed-by-rule approach which is applied by the FCC (Federal Communications Commission) to the 3.5 GHz Spectrum Access System (SAS) General Authorized Access (GAA) tier, etc. Some targets for future application may include the 28, 37 and 60 GHz bands. In particular, techniques that have been designed for unlicensed bands may be used straightforwardly (only adapting the channel access parameters as described in this document) but also various other systems can be used following a suitable adaptation (see for example the modification of 3GPP LTE to introduce LAA in the 5 GHz ISM band).

In embodiments, the wireless network 100 may include in particular the following: LTE and Long Term Evolution-Advanced (LTE-A) and LTE-Advanced Pro, 5th Generation (5G) communication systems, a NB-IoT network, a LPWAN, a MTC, an eMTC, a MIoT, an EC-GSM-IoT, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE, 3GPP LTE Advanced (Long Term Evolution Advanced)), 3GPP LTE-Advanced Pro, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 14), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), ETSI One M2M, IoT (Internet of things), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for "Autoradiopuhelin car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. It is understood that such exemplary scenarios are demonstrative in nature, and accordingly may be similarly applied to other mobile communication technologies and standards.

FIG. 2 illustrates further example reference signals including a TRS and the corresponding associated functions of a wireless network that includes a UE and a gNB, in accordance with various embodiments. For example, in addition to a TRS, there may be multiple reference signals for various functions, e.g., synchronization signal (SS), enhanced discovery reference signal (DRS), enhanced channel state information reference signal (CSI-RS), enhanced channel state information interference measurement resource (CSI-IM), and DMRS. The SS may be for synchronization function, DRS for radio resource management (RRM) function, the TRS for tracking or QCL functions, CSI-RS or CSI-IM for channel state information (CSI), or DMRS for demodulation functions. The various reference signals listed in FIG. 2 may be used in the wireless network 100 including the UE 103 and the gNB 101. The types of reference signals listed in FIG. 2 are for examples only, and are not limiting.

In embodiments, a DRS may be a causal signal that is to be sent based on known protocols, independent of future events, regardless data is to be transmitted or not. A transmission of an SS, or a DRS may be a causal transmission. On the other hand, an SS, a DMRS, a CSI-RS/IM, a CSI-RS, or a TRS may be sent when there is a data to be transmitted or to coordinate a future event from the gNB, e.g., by allowing automatic gain control, discrete Fourier transform (DFT) window placement, and hence referred to as a non-causal signal. There may be other types of signals used in a wireless system that may share same or similar attributes. Some reference signals may be always used in states such as RRC_CONNECTED, RRC_IDLE, RRC Inactive state, for activated SCell, or deactivated S Cell.

A gNB may transmit a signal periodically by a "beacon," and a UE may blindly detect a causal signal, to solve a "chicken-and-egg" dilemma for identification of the UE and the gNB. For example, an SS signal or a DRS signal may be used by a UE to perform autonomous cell discovery when the UE is unaware of the radio access network (RAN) while the RAN is unaware of the UE. Hence, an SS signal or a DRS signal may be sent by a "beacon," and a UE may blindly detect an SS signal or a DRS signal. The overhead of transmitting a beacon signal may be controlled by the network. For example, in a SCell, a gNB may configure the RRC protocol to transmit an SS signal or a DRS signal in various periods, e.g., 40 ms, 80 ms, or 160 ms. In addition, in a PCell, a gNB may broadcast an SS signal or a DRS signal by center six physical resource blocks (PRBs) of a frame when the Pcell is in an ON state and no transmission when the Pcell is in an OFF state.

Non-causal signals, e.g., a TRS, a CSI-RS signal, or a CSI-IM signal may be transmitted from a gNB on-demand, similar to a TRS. A UE may use a TRS signal, a CSI-RS signal, or a CSI-IM signal in RRC_CONNECTED state, when a gNB may control the transmission of a TRS signal, a CSI-RS signal, or a CSI-IM signal. Since MAC buffer traffic arrival may be random, it may save energy and improve efficiency to transmit a TRS signal, a CSI-RS signal, or a CSI-IM signal on-demand. Previously, a CSI-RS signal or a CSI-IM signal may be termed as "on-demand," since it may not be transmitted when a cell, e.g., a SCell, is deactivated, or a UE not in a RRC_CONNECTED state. Previous solutions do not have a CSI-RS signal or a CSI-IM signal transmitted on-demand when a SCell is activated, or the UE is in a RRC_CONNECTED state. On the other hand, embodiments herein may transmit a CSI-RS signal or a CSI-IM signal on-demand when a SCell is activated, or the UE is in a RRC_CONNECTED state. Furthermore, embodiments herein may introduce further overhead reductions when a UE is in RRC_IDLE state for the transmission of a CSI-RS signal or a CSI-IM signal. Embodiments herein may be presented in terms of a TRS signal. The mechanisms, systems, and processes may be equally applicable to other non-causal signals, e.g., a CSI-RS signal, or a CSI-IM signal.

FIG. 3 illustrates example identifiers for a UE in a wireless network including the UE and a gNB, in accordance with various embodiments. The various identifiers for a UE listed in FIG. 3 may be used in the wireless network 100 including the UE 103 and the gNB 101. The types of identifiers for a UE listed in FIG. 3 are for examples only, and are not limiting.

In embodiments, various radio network temporary identifiers (RNTIs) may be used to differentiate or identify a UE in a cell, a specific radio channel, a group of UEs in case of paging, a group of UEs for which power control is issued by the gNB, or system information transmitted for all the UEs. Many functions of a UE may be performed based on a RNTI. For example, RNTIs may be used to scramble cyclic redundancy check (CRC) bits of a PDCCH.

RNTIs may include multimedia broadcast/multicast service RNTI (M-RNTI), system information RNTI (SI-RNTI), paging RNTI (P-RNTI), random access RNTI (RA-RNTI), transmit power control RNTI (TPC-RNTI), enhanced interference management and traffic adaptation RNTI (eIMTA-RNTI), temporary cell RNTI (C-RNTI), permanent C-RNTI, and semi-persistent scheduling C-RNTI (SPS C-RNTI). TPC RNTI may be used for uplink power control purpose. Some RNTI, e.g., a M-RNTI, a SI-RNTI, a P-RNTI, may be provided when a RAN may not be aware of the UE, while some others may be provided after the RAN is aware of the UE.

The SI-RNTI may be transmitted on the PDCCH. The SI-RNTI may signal to all UEs in a cell where the broadcast SIBs may be found on the PDSCH. The UE may monitor the common search space for PDCCHs whose CRC bits are scrambled with the SI-RNTI. P-RNTI is the paging RNTI that refers to a group of UEs.

For the M-RNTI, the SI-RNTI, and the P-RNTI, the UE may decode the PDCCH whose CRC is scrambled by these RNTIs before a PRACH is received by the network. A UE may acquire coarse time and frequency synchronization information, obtained from PSS/SSS, a first system information, a second system information, e.g., MIB, SIBs, MSI, RMSI, or OSI, to transmit a PRACH. The DCI transmitted on these PDCCHs may schedule PDSCH transmissions on which the SIBs are conveyed.

The RA-RNTI may be assigned by a gNB to a UE after the UE has sent a PRACH. RA-RNTI can be addressed to multiple UEs, i.e., multiple UEs might decode PDCCH scrambled by the same RA-RNTI. As part of random access procedure, a gNB may generate random access response (RAR) as a response to the PRACH transmitted by the UE. The gNB may scramble PDCCH's CRC with RA-RNTI for transmission of PDSCH that carries RARs.

The C-RNTI may define data sent in a downlink (DL) direction. A C-RNTI may be a temporary C-RNTI, a SPS C-RNTI, or a permanent C-RNTI. A temporary C-RNTI may be allocated to a UE during random access procedure, e.g., with a RRC Connection Setup message, and may turn into a permanent C-RNTI. The SPS C-RNTI may be used if the UE is running services with a predictable unchanging quality of service (QoS) profile. For RRC_IDLE mode, the C-RNTI and RA-RNTI may be applied to the random access procedures following a PRACH. Hence, the RAN is already aware of the UE since the RAN has successfully detected the PRACH that triggers the PDCCH. The CRC of the PDCCH is scrambled with either the temporary C-RNTI or RA-RNTI.

FIG. 4 illustrates an example process 400 for a gNB to transmit a TRS to a UE, triggered by a PRACH received from the UE, in accordance with various embodiments. For example, the process 400 may be performed for the gNB 101 to transmit the first TRS 117 to the UE 103, triggered by a PRACH received from the UE 103, in accordance with various embodiments.

The process 400 may include, at 401, transmitting, by PSS/SSS, coarse time and frequency synchronization information to a UE. In some embodiments, at 401, the gNB 101 may transmit, by PSS/SSS, the coarse time and frequency synchronization information 111 to the UE 103.

The process 400 may further include, at 403, transmitting a first system information and a second system information to the UE. In some embodiments, at 403, the gNB 101 may transmit the first system information 113 and the second system information 115 to the UE 103.

The process 400 may further include, at 405, receiving a PRACH from the UE to trigger a transmission of a TRS to the UE. For example, at 405, the gNB 101 may receive a PRACH from the UE 103 to trigger a transmission of the first TRS 117 to the UE 103.

The process 400 may further include, at 407, transmitting the TRS to the UE. In some embodiments, at 407, the gNB 101 may transmit the first TRS 117 to the UE 103.

FIG. 5 illustrates an example process 500 for a UE to cause a transmission of a PRACH to trigger a transmission of a TRS by the gNB, in accordance with various embodiments. In embodiments, the process 500 may be performed by the UE 103 as shown in FIG. 1.

The process 500 may include, at 501, causing coarse time and frequency synchronization information, obtained from PSS/SSS, to be stored in the memory. In some embodiments, at 501, the UE 103, or the processing circuitry 149, may cause coarse time and frequency synchronization information 142, obtained from PSS/SSS, to be stored in the memory 141.

The process 500 may further include, at 503, decoding, based on the coarse time and frequency synchronization information stored in the memory, a physical broadcast channel to obtain a first system information. In some embodiments, at 503, the UE 103, or the processing circuitry 149, may decode, based on the coarse time and frequency synchronization information 142 stored in the memory 141, a physical broadcast channel to obtain the first system information 143.

The process 500 may further include, at 505, acquiring, based on the first system information, a second system information. In some embodiments, at 505, the UE 103, or the processing circuitry 149, may acquire, based on the first system information 143, the second system information 144.

The process 500 may further include, at 507, causing transmission of a PRACH, based on the first and second system information, to trigger a transmission of a TRS by the gNB. In some embodiments, at 507, the UE 103, or the processing circuitry 149, may cause a transmission of a PRACH, based on the first system information 143, the second system information 144, to trigger a transmission of the first TRS 145.

FIG. 6 illustrates another example process 600 for a UE to cause a transmission of a PRACH to trigger a transmission of a TRS by the gNB, in accordance with various embodiments. The process 600 may be similar to the process 500, with some additional details. The process 600 may be performed by the UE 103 as shown in FIG. 1.

The process 600 may include an interaction 601. At the interaction 601, a UE, e.g., the UE 103, may obtain the coarse time and frequency synchronization information 142 from PSS/SSS. For example, the UE 103 may employ a 128-point FFT to detect PSS/SSS from which it can obtain the coarse time and frequency synchronization information 142. At this point, the system bandwidth is unknown to the UE and PSS/SSS may be transmitted with fixed bandwidth, e.g., on the center 6 PRBs, including 72 OFDM subcarriers. The PSS/SSS transmission may also indicate to the UE 103 the cyclic prefix (CP) length as well as the duplex mode and the physical cell ID (PCI). The coarse time and frequency synchronization information 142 may be sufficient to decode the PBCH, which may also be transmitted on the center six PRBs.

The process 600 may include an interaction 603. At the interaction 603, a UE, e.g., the UE 103, may decode the PBCH to acquire the system bandwidth (BW), PHICH configuration, system frame number (SFN), and number of CRS ports, which may be carried by MIB or a first system information as payloads. Before the UE 103 decodes the MIB, the UE 103 may assume a TRS may be transmitted on the center 6 PRBs. The UE 103 may use information on the center 6 PRBs to demodulate the PBCH. The PBCH may carry the MIB to indicate to the UE 103 the actual system bandwidth.

The process 600 may include an interaction 605. At the interaction 605, a UE, e.g., the UE 103, may acquire SIB1 and SIB2, or a second system information, that may contain the PRACH configuration, the random access channel (RACH) configuration, as well as the DL reference signal transmit (Tx) power that the UE 103 may use for pathloss compensation when transmitting the PRACH sequence. For example, the UE 103 may decode the PDCCH, which is interleaved across the entire system bandwidth of up to 20 MHz. The PDCCH may carry the DCI scheduling the PDSCH transmitted periodically carrying SIBs. The PDSCH may be scheduled in any part of the system bandwidth, and may allow the UE to decode the respective channel. Furthermore, the UE 103 may subsequently decode the PDSCH according to that DCI to acquire SIBs. The UE 103 may monitor the common search space for PDCCHs whose CRC bits are scrambled with the SI-RNTI. Hence, the transmission bandwidth of TRS may be tailored to the bandwidth over which PDCCH and PDSCH transmissions can occur. The energy savings that can be achieved by controlling the overhead from these TRS transmissions is thus related to the bandwidth over which the aforementioned channels can be transmitted.

The process 600 may include an interaction 607. At the interaction 607, a UE, e.g., the UE 103, may transmit the PRACH, after having acquired system information, e.g., the first system information, the second system information, the MIB, the SIBs, which may carry the SI-RNTI. The PRACH may trigger a transmission of the enhanced TRS by the gNB 101. According to various embodiments, using a PRACH transmission to trigger TRS transmissions may solve the "chicken-and-egg" dilemma so that the RAN may be aware of the UE and the channels, and a TRS can be transmitted "on demand" to decode data at the UE.

In addition, the UE 103 may receive the TRS. Based on the TRS, the UE 103 may perform fine time and frequency synchronization, where the fine time and frequency synchronization is more accurate than the coarse time and frequency synchronization information 142. For example, the UE 103 may have a more accurate FFT window to decode data, where the FFT size may be larger than or equal to 128 depending on the actual system bandwidth.

FIG. 7 illustrates an example diagram 700 of uplink and downlink frames demonstrating operations between a UE and a gNB for a transmission of a TRS, in accordance with various embodiments. The uplink and downlink frames of the diagram 700 may demonstrate operations shown in the process 400, the process 500, or the process 600, performed by the gNB 101 or the UE 103 in FIG. 1.

The diagram 700 includes multiple radio frames, e.g., a radio frame #n−1, #n, #n+1, #n+2, #n+3, and #n+4, where the radio frame number may imply a time sequence. Within a radio frame, there may be one or more downlink slots 701, one or more uplink slots 705, and some special slot 703. Some of the downlink slot 711 may contain the reference signals, e.g., SS, DRS, carried in MIB. Some of the downlink slot 713 may contain the reference signals, e.g., SS, DRS, DMRS, carried in SIB1 or SIB2. In addition, some of the downlink slot 715 may contain RAR information, while some of the downlink slot 717 may contain enhanced physical downlink control channel (EPDCCH) or PDSCH transmission. The slots 711, the slots 713, the slots 713, or the slots 717, may be examples of the downlink slot 701. On the other hand, some of the uplink slots 757 may contain PRACH, while some of the uplink slots 759 may contain PUSCH. The slots 757 and the slots 759 may be examples of the uplink slots 705. The sequencing of the various slots, e.g., the downlink slot 711, the downlink slot 713, the uplink slots 757, and the downlink slot 715, may follow a process similar to the process 400, the process 500, or the process 600.

FIGS. 8-10 illustrate various example diagrams of uplink and downlink frames demonstrating operations between a UE and a gNB for a transmission of a TRS over various bandwidth, in accordance with various embodiments. The example frames shown in FIGS. 8-14 follow a same pattern as the frames in the diagram 700 shown in FIG. 7.

FIG. 8 illustrates a diagram 800 of uplink and downlink frames demonstrating operations between a UE and a gNB for a transmission of a TRS over a same bandwidth of the SS. The downlink slot 811 and the downlink slot 813 may be similar to the downlink slot 711 and the downlink slot 713, respectively, and may carry the MIB, SIB1, or SIB2.

In addition, the MIB, SIB1, or SIB2 does not signal a different bandwidth to transmit a TRS. Hence, the UE 103 may assume or expect that a TRS may be transmitted with the same bandwidth, e.g., the bandwidth of the SS (e.g., 6 PRBs) when the gNB 101 may be in an energy savings mode. In addition, the RAR or SI in slot 815 triggered by a PRACH in slot 857 may also be transmitted on the same bandwidth as MIB and SIB1. As a result, communication between the gNB 101 and the UE 103 before RRC connection setup may be limited to a fixed narrowband bandwidth, in which MIB, SIB1, and other SI are transmitted.

After RRC connection setup, and once the UE 103 has acknowledged RRC connection setup is completed, the gNB 101 may signal to the UE 103 a UE-specific bandwidth. Afterwards, further transmissions between the gNB 101 and the UE 103 may occur on the UE-specific bandwidth signaled by the gNB 101.

In other words, a cell-specific "system" bandwidth may include the fixed narrowband bandwidth over which SI is transmitted. This bandwidth may be a control plane (C-Plane) in the PHY and it can be shared by all UEs irrespective of the RAT. Moreover, after RRC connection setup, the TRS may either be transmitted over the entire system bandwidth or over a dedicated transmission bandwidth determined during RRC connection setup.

FIG. 9 illustrates a diagram 900 of uplink and downlink frames demonstrating operations between a UE and a gNB for a transmission of a TRS over a configurable cell-specific bandwidth. The downlink slot 911, the downlink slot 913, the downlink slot 915, or the downlink slot 917, may carry the MIB, SIB1, or SIB2, while an uplink slot 957 may carry the PRACH.

The MIB carried in the downlink slot 913 may indicate or signal a configurable cell-specific bandwidth over which the TRS, the SIB1, or all other SI may be transmitted. For example, the TRS may be transmitted over the configured bandwidth within the downlink slot 911, while the SIBs may be transmitted over the configured bandwidth within the downlink slot 915 and the downlink slot 917. The cell-specific configurable bandwidth in the MIB carried in the downlink slot 913 may serve as a PHY C-Plane that can be shared by all UEs irrespective of the RAT/service. However, using a C-Plane of configurable bandwidth, rather than of fixed bandwidth may improve coverage with increased frequency diversity and capacity with more resources to schedule.

After RRC connection setup, the gNB 101 may signal a UE-specific transmission bandwidth to the UE 103, which may differ from the configurable bandwidth signaled in the MIB. Once the UE 103 may acknowledged RRC connection setup is completed, all further transmissions between the gNB 101 and the UE 103 may occur on that signaled bandwidth. After RRC Connection setup, the TRS may be transmitted either over the entire system bandwidth or over the configured transmission bandwidth.

FIG. 10 illustrates a diagram 1000 of uplink and downlink frames demonstrating operations between a UE and a gNB for a transmission of a TRS over an extended bandwidth. The downlink slot 1011 may carry the MIB, SIB1, or SIB2, while an uplink slot 1057 may contain PRACH. In embodiments, the PRACH contained in uplink slot 1057 may trigger a bandwidth extension.

In embodiments, the MIB and SIBs may only be transmitted on a fixed narrowband bandwidth, e.g., the center 6 PRBs of the downlink slot 1011 when the gNB may be in an energy savings mode. The fixed narrowband bandwidth may be a first bandwidth. When the gNB 101 may detect the PRACH from the uplink slot 1057, the gNB 101 may determine to transmit a TRS in a second bandwidth that is larger than the first bandwidth. In addition, triggered by the PRACH, the gNB 103 may transmit the SI (or the RAR) in the first opportunity after at least one TRS waveform has been transmitted over the extended bandwidth. The additional SI or the RAR may allow the UE 103 to perform fine timing synchronization for the expanded bandwidth. After the bandwidth extension, all further communications between the UE 103 and the gNB 101 may be restricted to this expanded bandwidth.

Embodiments herein may not send a TRS in the downlink slots of the RAR window 1017 that does not contain resources reserved for TRS. If the gNB simply started to transmit TRS upon detection of a PRACH trigger, the rate matching around TRS would not be unique. Additional latency may exist when the RAR window 1017 may start several slots before the next TRS occasion.

After the RRC connection setup, the gNB 101 may signal a UE-specific bandwidth to the UE 103. After the UE 103 may acknowledge the RRC connection setup is completed, the gNB 101 and the UE 103 may communicate over the UE-specific transmission bandwidth. After RRC Connection setup, the TRS can be transmitted over either the entire system bandwidth or the configured transmission bandwidth.

Figure 11:
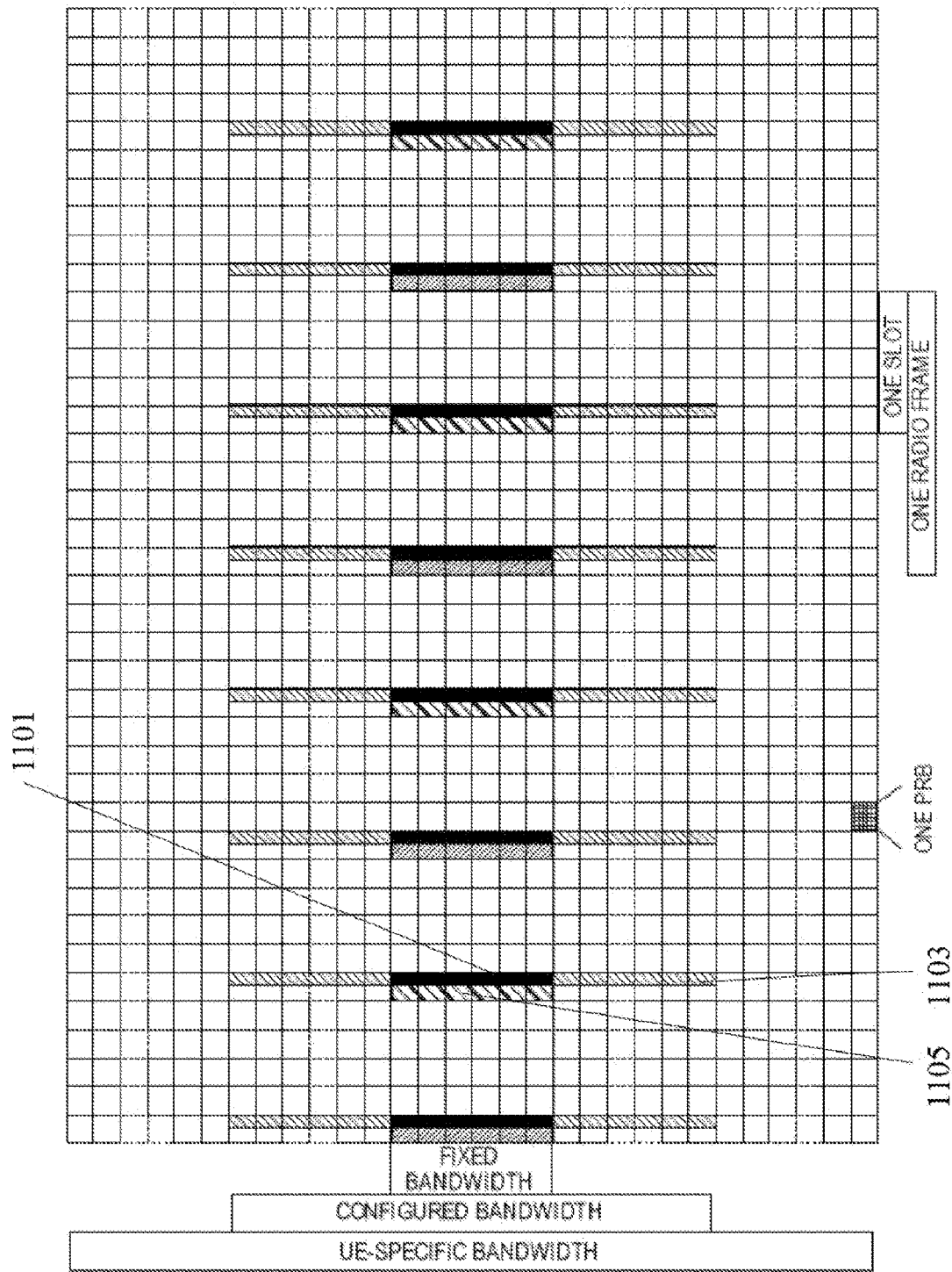
FIG. 11 illustrates a diagram of a UE rate matching of a bandwidth by a gNB to transmit a TRS to another UE, in accordance with various embodiments.

FIG. 11 illustrates a diagram of a UE rate matching of a bandwidth by a gNB to transmit a TRS to another UE, in accordance with various embodiments. The rate matching may be performed by another UE, e.g., the UE 105, the gNB 101, and the UE 103.

Embodiments shown in FIGS. 8-10 are about bandwidth allocation by a gNB for a transmission of a TRS to a UE in a cell of the gNB, when the gNB may be in an energy saving mode not communicating with another UE. Hence, the downlink frames and uplink frames shown in FIGS. 8-10 may be for a first UE at the cell while the gNB may be in energy saving mode and only transmitting in the fixed narrowband bandwidth, e.g., a fixed narrowband bandwidth 1201. As described above in FIG. 10, after the PRACH is received by the gNB 101, the bandwidth for a TRS transmission may be expanded to a configurable bandwidth, e.g., a bandwidth 1103.

When a second UE arrives in the cell of the gNB 101, where the gNB is operating in the configurable bandwidth 1103, the second UE may still assume that a TRS may only be transmitted in the fixed narrowband bandwidth 1101. Hence, the second UE may only rate matches its bandwidth 1105 to the fixed narrowband bandwidth 1101, e.g., the center six PRBs. Hence, the second UE may decode the bandwidth 1105 to acquire the MIB, or SIBs, to transmit a PRACH.

FIG. 12 illustrates a table summary of configured bandwidths allocations by a gNB to transmit a TRS to a UE, when a second UE is in communication with the gNB, in accordance with various embodiments.

When the gNB 101 may transmit a TRS to the UE 103, the gNB 101 may transmit a TRS in various bandwidths. The gNB 101 may be in energy savings mode and may only transmit a TRS in a first bandwidth, e.g., a fixed narrowband bandwidth. Alternatively, the gNB 101 may be in an active state and may transmit TRS in a second bandwidth, where the second bandwidth may be an extension over the first bandwidth. When a second UE, e.g., the UE 105, arrives in a cell of the gNB 101, where the gNB 101 may transmit a TRS with the UE 103, the UE 105 may have different bandwidth to use for a TRS, depending on the configuration of the bandwidth used by the gNB 101 to transmit a TRS to the UE 103.

For example, as alternative 1 (Alt. 1), the UE 105 may assume that TRS transmissions are within the first bandwidth, e.g., a fixed narrowband bandwidth, during the period when a MIB or SIBs are acquired, and after PRACH is transmitted, until after RRC connection setup. The Alt. 1 may correspond to the bandwidth allocation for a TRS illustrated in FIG. 8. As shown in FIG. 8, the bandwidth for a TRS transmission may be allocated to the same fixed system bandwidth for MIB and SIBs, which may be the center 6 PRBs, at a time interval before PRACH is transmitted, or after PRACH is transmitted.

As alternative 2 (Alt. 2), the UE 105 may assume TRS transmissions are within the second bandwidth that may be an extension over the first bandwidth, when a MIB or SIBs are acquired, after PRACH is transmitted, or after RRC connection setup. In other words, for Alt. 2, the first bandwidth may coincide with the second bandwidth. The Alt. 2 may correspond to the bandwidth allocation for a TRS illustrated in FIG. 9.

As alternative 3 (Alt. 3), the UE 105 may assume TRS transmissions are within the first bandwidth, e.g., a fixed narrowband bandwidth, before a PRACH is transmitted, and may be in the second bandwidth after a PRACH is transmitted. The Alt. 2 may correspond to the bandwidth allocation for a TRS illustrated in FIG. 10.

Figure 13:
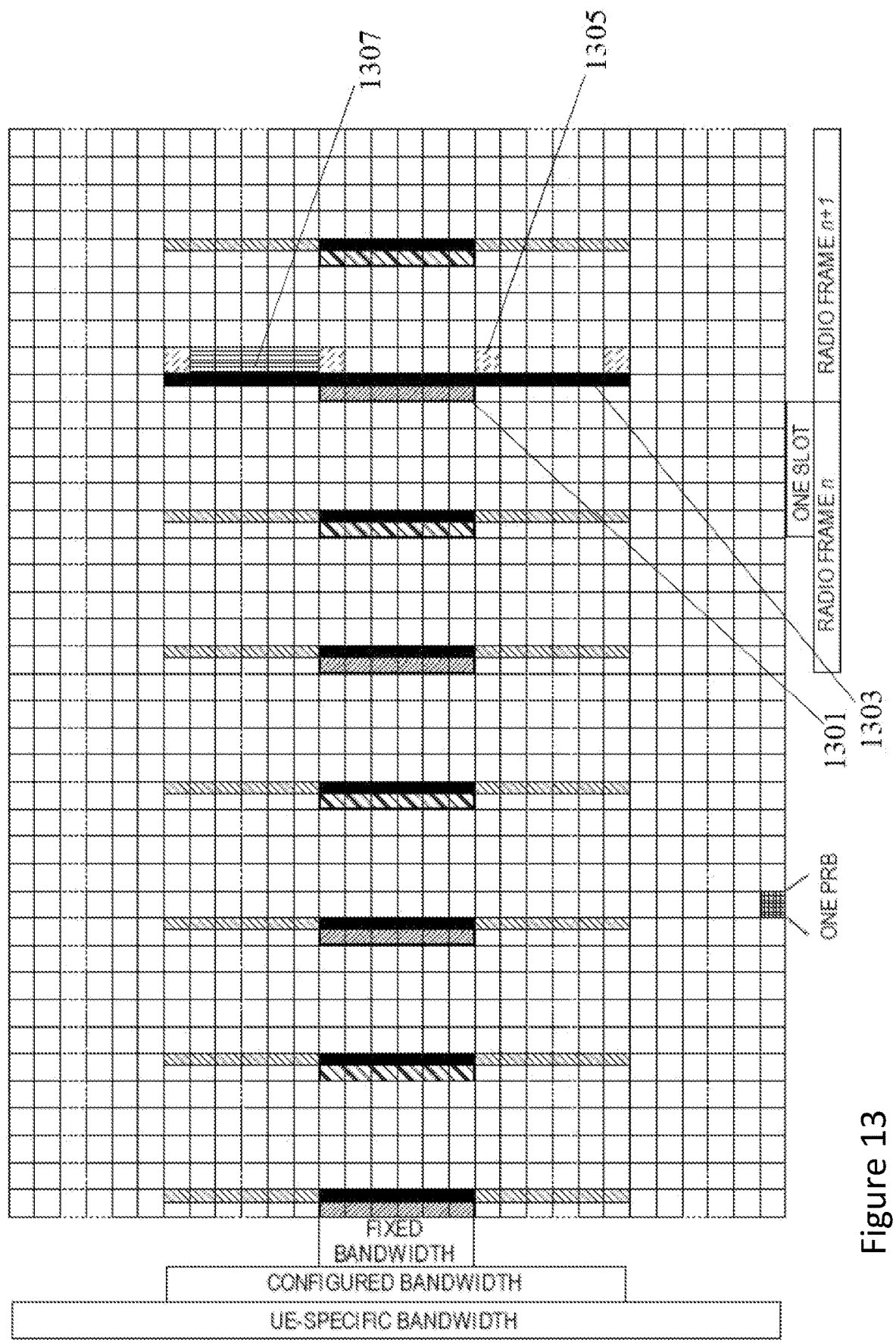
FIG. 13 illustrates a diagram of bandwidth allocated to transmit a paging message and associated TRS, in accordance with various embodiments.

FIG. 13 illustrates a diagram of bandwidth allocated to transmit a paging message and associated TRS, in accordance with various embodiments.

In embodiments, the paging occasions may be known to both the UE and gNB. Before each paging occasion, a TRS occasion may be defined as well. Hence, for the transmission of paging messages, instead of having UEs trigger TRS transmissions via a PRACH, the arrival of the paging message at the gNB MAC buffer itself can trigger TRS transmissions for paging.

In embodiments, similar to alternative 1 above, both the TRS and the channels carrying the paging message (including associated DMRS for demodulation) are transmitted over a fixed specified narrowband bandwidth. If the TRS transmission occurs prior to the paging message transmission, the UE can use the TRS for automatic gain control (AGC), fine timing, FFT window placement, frequency offset tracking, etc. On the other hand, the gNB may transmit the TRS during the TRS occasion if there is a paging message to transmit. At the UE, before a paging occasion, the UE may blindly detect the TRS before the paging occasion. If a paging message transmission is scheduled, the UE detects the TRS preamble, processes it (e.g., performs AGC, fine timing . . . ) and proceeds to decoding the paging message. UEs may rate match around or puncture the TRS occasion of fixed specified narrowband bandwidth irrespective of whether actual TRS is transmitted since the arrival of paging messages at the gNB buffer is a stochastic event. TRS here is similar to a preamble as it is transmitted if it is accompanied by associated data transmission.

In other embodiments, similar to alternative 2 above, both the TRS and the channels carrying the paging message (including associated DMRS for demodulation) are transmitted over the configurable bandwidth signaled in the MIB. If the TRS transmission occurs prior to the paging message transmission, the UE may use the TRS for automatic gain control (AGC), fine timing, FFT window placement, frequency offset tracking, etc. The gNB may transmit the TRS during the TRS occasion if there is a paging message to transmit. At the UE, before each paging occasion, the UE may blindly detect the TRS before the paging occasion. If a paging message transmission is scheduled, the UE detects the TRS preamble, processes it (e.g., performs AGC, fine timing . . . ) and proceeds to decoding the paging message. UEs may rate match around or puncture the TRS occasion with the signaled bandwidth irrespective of whether actual TRS is transmitted since the arrival of paging messages at the gNB buffer is a stochastic event. TRS here is similar to a preamble as it is only transmitted if it is accompanied by associated data transmission.

In other embodiments, similar to alternative 3 above, a TRS may be periodically transmitted with a fixed specified narrowband bandwidth. For example, TRS may be transmitted together with MIB and SIB transmissions in the downlink. UEs, however, may rate match around or puncture the TRS occasion of the bandwidth signaled in the MIB. Channels carrying the paging message (including associated DMRS for demodulation) are transmitted over the configurable bandwidth signaled in the MIB. If a paging message arrives in the gNB MAC buffer, the gNB extends the TRS transmission bandwidth to the one signaled in the MIB during subsequent TRS occasions. The gNB transmits the paging message in the first paging occasion after the TRS has been transmitted over the extended bandwidth in a TRS occasion. The paging occasion may thus occur after the TRS occasion. If a paging message transmission is scheduled, the UE detects the TRS preamble, processes it (e.g., performs AGC, fine timing . . . ) and proceeds to decoding the paging message. UEs may rate match around or puncture the TRS occasion with the signaled bandwidth irrespective of whether actual TRS is transmitted since the arrival of paging messages at the gNB buffer is a stochastic event. TRS here is similar to a preamble as it is only transmitted over the configured bandwidth if it is accompanied by associated data transmission.

As shown in FIG. 13, in radio frame n the paging message arrives in the gNB MAC buffer. The second slot of radio frame n+1 is assumed to be a paging occasion. In slot one of radio frame n+1 the gNB extends the bandwidth during the TRS occasion from the first bandwidth 1301 to a second bandwidth 1303. In slot 2 of radio frame n+1 the gNB schedules the paging message. In this example, a PDCCH is send over four PRB pairs 1305 with CRC scrambled by the P-RNTI scheduling the PDSCH carrying the paging message in the resources 1307. Note, however, that the paging occasion may simply occur after the TRS occasion, not necessarily in the next slot.

The TRS occasions are known to the UE either by specification, e.g., for initial attach, or by configuration, e.g., RRC connection setup and SCell addition. A TRS measurement timing configuration (TMTC) contains at least a periodicity and a measurement bandwidth. The periodicity may be signaled by a value, e.g., {5,10,20} ms, albeit other values are not precluded. Alternatively, it can be signaled by a bitmap which indicates the downlink slots with a configured TRS occasion. The UE aligns this bitmap with the SFN and assumes that this bitmap repeats in time. The TMTC may also indicate a frequency shift and/or a scrambling identity for the TRS, e.g., to randomize and/or orthogonalize TRS transmissions among interfering cells. Whether the gNB actually sends TRS during these occasions is gNB implementation. A TRS occasion precedes a paging occasion to allow the UE fine FFT window placement with the higher sampling rate.

In LTE, it is not specified what the UE assumption is regarding TRS/CRS "occasions," e.g., when a UE in RRC_IDLE mode checks for the P-RNTI, it is left to UE implementation when it wakes up and uses the CRS to warm-up the RF to be ready for data reception during the active cycle of the DRX period.

According to various embodiments, the UE assumption regarding TRS transmissions is defined, e.g., before every paging occasion there is a TRS occasion. Furthermore, the UE may blindly detect whether there is an actual TRS transmission as the gNB will only transmit TRS in the TRS occasion if there is a paging message in the gNB MAC buffer. Since this is a random event, all connected UEs may rate match around or puncture the TRS occasion.

In embodiments, for RRC_CONNECTED UEs, the gNB dynamically indicates in the DCI scheduling a PDSCH whether the latter is rate-matched around the TRS occasion or not. In other words, if the gNB intends to transmit a paging message in the paging occasion and hence intends to transmit TRS in a prior TRS occasion, it can dynamically instruct the UE to rate match the PDSCH around the actual TRS transmission. Alternatively, if there is no TRS transmission during a given TRS occasion, e.g., because the gNB MAC buffer does not have a paging message to transmit, the gNB can instruct the UE to not rate match around the TRS occasion and to map the PDSCH into the resources occupied by the TRS occasion instead.

Figure 14:
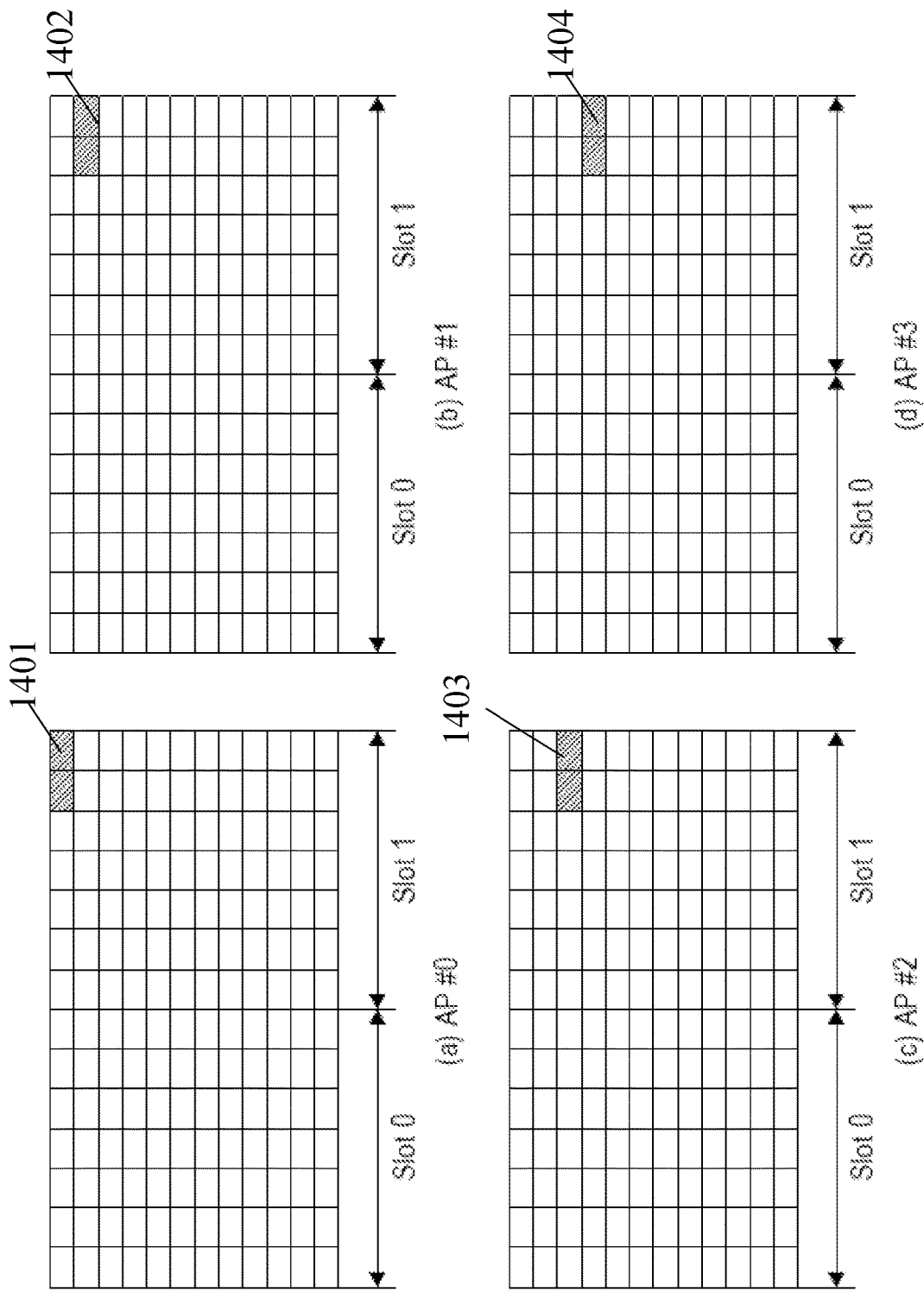
FIG. 14 illustrates a diagram of a TRS design, in accordance with various embodiments.

FIG. 14 illustrates a diagram of a TRS design, in accordance with various embodiments.

A TRS can be transmitted in a periodic manner after it has been triggered to start the transmission. More specifically, the slots for the transmission of TRS may be defined as the downlink slots or special slots in TDD system satisfying:

$$(10 \times n_f + \lfloor n_s/2 \rfloor - N_{OFFSET,TRS}) \bmod TRS_{PERIODICITY} = 0.$$

where $n_f$ and $n_s$ are radio frame number and slot number; $N_{OFFSET,TRS}$ and $TRS_{PERIODICITY}$ are the slot offset and periodicity of the TRS transmission. For instance, $N_{OFFSET,TRS}$ and $TRS_{PERIODICITY}$ are defined by the parameter $I_{TRS}$, which is given in the Table 1. Note that other values of $I_{TRS}$, $N_{OFFSET,TRS}$ and $TRS_{PERIODICITY}$ can be easily extended from the examples as shown in the Table 1. Further, configuration index can be predefined or configured by higher layers via MIB, SIB or dedicated RRC signaling.

TABLE 1

Periodicity and slot offset configuration for TRS

| Configuration Index $I_{TRS}$ | Periodicity $TRS_{PERIODICITY}$ (ms) | slot offset $N_{OFFSET, TRS}$ |
|---|---|---|
| 0-4 | 5 | $I_{TRS}$ |
| 5-14 | 10 | $I_{TRS} - 5$ |
| 15-34 | 20 | $I_{TRS} - 15$ |
| 35-74 | 40 | $I_{TRS} - 35$ |
| 75-154 | 80 | $I_{TRS} - 75$ |

Alternatively, a TRS transmission may be triggered periodically via DCI or MAC-CE. As a further extension, a set of configuration parameters for a TRS transmission may be configured by higher layers via RRC signaling, while one field in the DCI may be used to indicate which configuration parameter from the set of configuration parameters is used for TRS transmission.

In embodiments, the TRS follows the design principle for CSI-RS in the existing LTE or NR specification. In one example, the TRS can reuse the same CSI-RS design from the LTE or NR specification. However, to allow efficient time and frequency tracking, a subset of CSI-RS configuration may be configured. For instance, only one CSI-RS is configured in one cell.

In another example, the TRS pattern may not be same as the existing CSI-RS. In this example, a TRS is transmitted in the last two OFDM symbols, e.g., symbols 1401, 1402, 1403, and 1404, and resource mapping for each antenna port (AP) is multiplexed in a FDM manner. Orthogonal cover code (OCC) may or may not apply on the transmission of TRS between two consecutive symbols in the time domain. In the case when OCC is not used, TRS transmitted in these two consecutive symbols is identical or different. In the latter case, TRS can be defined as function of symbol index to randomize inter-cell interference.

As a further extension, the symbol gap between repeated CSI-RS transmissions can be predefined in the specification or configured by higher layers via SIB or RRC signaling. In other embodiments, the TRS can be generated based on Zadoff-Chu(ZC) sequence. In particular, the TRS sequence can be generated as follows:

$$r_{TRS}^{(p)}(n) = \exp(j\alpha n) \cdot \bar{r}_{u,v}(n)$$

Where $\bar{r}_{u,v}(n)$ is the base sequence for the transmission of TRS; u is the sequence-group number and v is the sequence number; α is the cyclic shift and p is the antenna port index.

Note that u and v can be determined as a function of physical cell identity, or a virtual cell identity or slot/slot/frame index. The cyclic shift α can be defined as a function of antenna port index p, physical or virtual cell identity. In one example, a can be defined as $$\alpha = \frac{2\pi n_p}{M}$$

$$n_p = \left(\Delta_{TRS} + M \cdot \frac{p}{N_{ap}}\right) \mod(M),$$

$$p = \{0, 1, \ldots, N_{ap} - 1\}$$

Where M is a constant, which may be predefined or configured by a higher layer via MIB, SIB or RRC signaling. $\Delta_{TRS}$ is a cell-specific cyclic shift, which can be configured via MIB, SIB or RRC signaling. $N_{ap}$ is the number of APs at gNB.

To allow efficient time and frequency tracking, a repeated structure in the time domain may be beneficial. In this case, a simple phase differentiator at the receiver can be implemented to estimate the frequency offset by exacting the phase difference between repeated signals.

To generate the repeated structure for TRS signal, in one example, a larger subcarrier spacing can be employed to create a shortened OFDM symbol. Subsequently, this shortened symbol can be repeated in the time domain to generate a full OFDM symbol. Note that to keep the same or integer number of sampling rate, it may be desirable to specify $K=2^N$ subcarriers, where N>1 is an integer.

In another example, interleaved FDMA (IFDMA) signal structure can be adopted to generate repeated TRS signals in the time domain. In particular, TRS symbols are mapped in every K subcarrier in the frequency domain, while the remaining subcarriers are set to zero. This IFDMA structure with a RePetition Factor (RPF) of K would create K repeated blocks in the time domain. Note that similar to the 1$^{st}$ option, it may be desirable to define $K=2^N$ in order to keep the same or integer number of sampling rate, where N>1 is an integer.

In one example, in the case when K=2, TRS symbols are mapped to every even subcarrier, which would create 2 repeated blocks in the time domain.

To reduce inter-cell interference, the symbol/slot/sframe index for the IFDMA signal can be determined by cell ID or virtual cell ID. In frequency domain, each cell could use different offset, and the offset should be selected from $2^1, \ldots, 2^{N-1}$ which can be determined by cell ID or virtual cell ID or configured by higher layer signaling.

Figure 15:
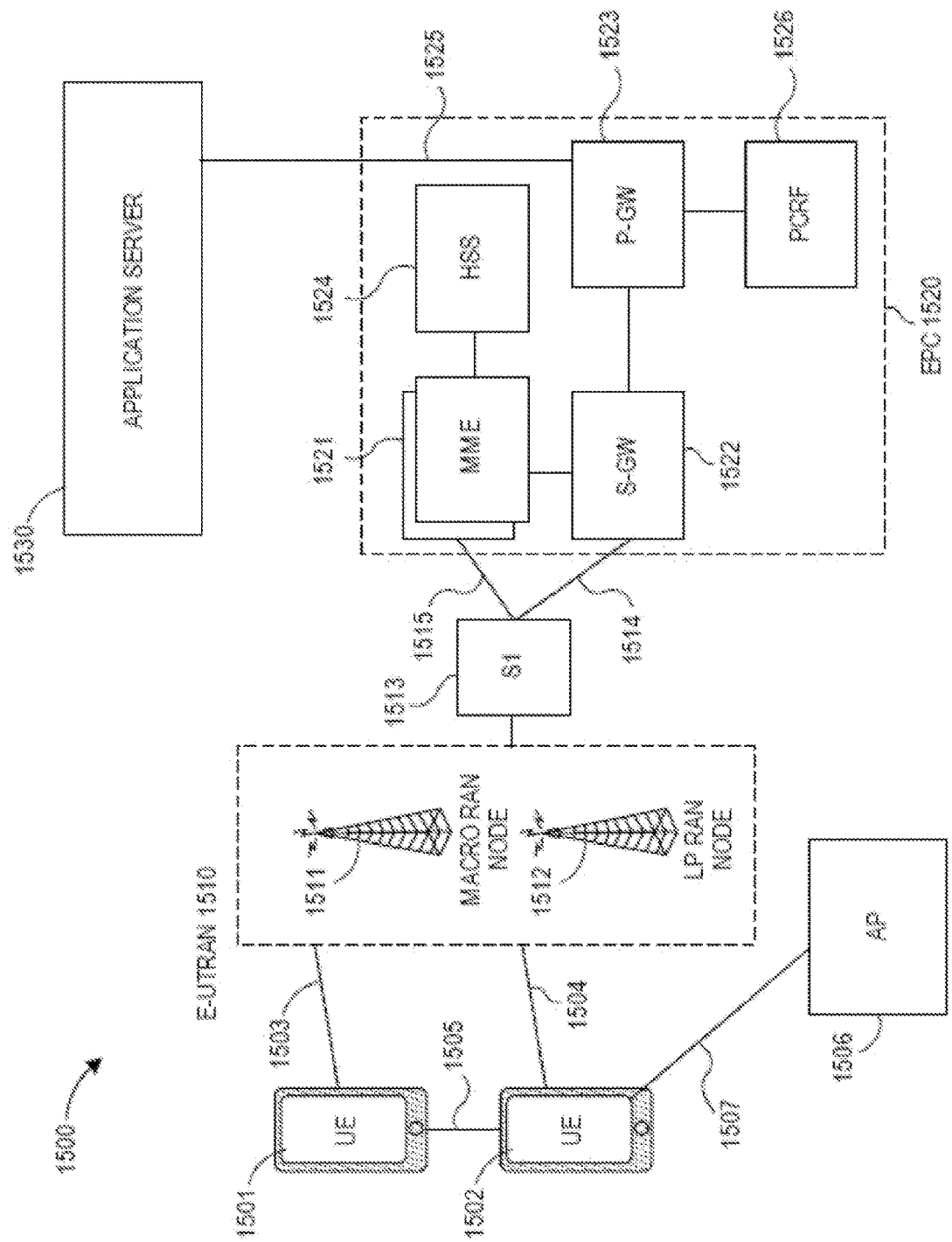
FIG. 15 illustrates an example architecture of a wireless network that includes multiple UEs, and one or more gNBs, in accordance with various embodiments.

FIG. 15 illustrates an example architecture of a wireless network that includes multiple UEs, and one or more gNBs, in accordance with various embodiments. The system 1500 is shown to include a user equipment (UE) 1501 and a UE 1502. The UEs 1501 and 1502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1501 and 1502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1501 and 1502 may be configured to connect, e.g., communicatively couple, with a radio access network (RAN)—in this embodiment, an Evolved Universal Mobile Telecommunications System (UMTS) Terrestrial Radio Access Network (E-UTRAN) 1510. The UEs 1501 and 1502 utilize connections 1503 and 1504, respectively, each of which comprises a physical communications interface or layer (discussed in further detail below); in this example, the connections 1503 and 1504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1501 and 1502 may further directly exchange communication data via a ProSe interface 1505. The ProSe interface 1505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1502 is shown to be configured to access an access point (AP) 1506 via connection 1507. The connection 1507 can comprise a local wireless connection, such as a connection consistent with any IEEE 802.11 protocol, wherein the AP 1506 would comprise a wireless fidelity (WiFi®) router. In this example, the AP 1506 is shown to be connected to the Internet without connecting to the core network of the wireless system (described in further detail below).

The E-UTRAN 1510 can include one or more access nodes that enable the connections 1503 and 1504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The E-UTRAN 1510 may include one or more RAN nodes for providing macrocells, e.g., macro RAN node 1511, and one or more RAN nodes for providing femtocells or picocells (e.g., cells having smaller coverage areas, smaller user capacity, or higher bandwidth compared to macrocells), e.g., low power (LP) RAN node 1512.

Any of the RAN nodes 1511 and 1512 can terminate the air interface protocol and can be the first point of contact for the UEs 1501 and 1502. In some embodiments, any of the RAN nodes 1511 and 1512 can fulfill various logical functions for the E-UTRAN 1510 including, but not limited to, radio network controller (RNC) functions such as radio bearer management, uplink and downlink dynamic radio resource management and data packet scheduling, and mobility management.

In accordance with some embodiments, the UEs 1501 and 1502 can be configured to communicate using Orthogonal Frequency-Division Multiplexing (OFDM) communication signals with each other or with any of the RAN nodes 1511 and 1512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1511 and 1512 to the UEs 1501 and 1502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1501 and 1502. The physical downlink control channel (PDCCH) may carry information about the transport format and resource allocations related to the PDSCH channel, among other things. It may also inform the UEs 1501 and 1502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1511 and 1512 based on channel quality information fed back from any of the UEs 1501 and 1502. The downlink resource assignment information may be sent on the PDCCH used for (e.g., assigned to) each of the UEs 1501 and 1502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 1511 and 1512 may communicate with one another and/or with other access nodes in the E-UTRAN 1510 and/or in another RAN via an X2 interface, which is a signaling interface for communicating data packets between ANs. Some other suitable interface for communicating data packets directly between ANs may be used.

The E-UTRAN 1510 is shown to be communicatively coupled to a core network—in this embodiment, an Evolved Packet Core (EPC) network 1520 via an S1 interface 1513. In this embodiment the S1 interface 1513 is split into two parts: the S1-U interface 1514, which carries traffic data between the RAN nodes 1511 and 1512 and the serving gateway (S-GW) 1522, and the S1-mobility management entity (MME) interface 1515, which is a signaling interface between the RAN nodes 1511 and 1512 and MMEs 1521.

In this embodiment, the EPC network 1520 comprises the MMEs 1521, the S-GW 1522, the Packet Data Network (PDN) Gateway (P-GW) 1523, and a home subscriber server (HSS) 1524. The MMEs 1521 may be similar in function to the control plane of legacy Serving General Packet Radio Service (GPRS) Support Nodes (SGSN). The MMEs 1521 may manage mobility aspects in access such as gateway selection and tracking area list management. The HSS 1524 may comprise a database for network users, including subscription-related information to support the network entities' handling of communication sessions. The EPC network 1520 may comprise one or several HSSs 1524, depending on the number of mobile subscribers, on the capacity of the equipment, on the organization of the network, etc. For example, the HSS 1524 can provide support for routing/roaming, authentication, authorization, naming/addressing resolution, location dependencies, etc.

The S-GW 1522 may terminate the S1 interface 1513 towards the E-UTRAN 1510, and routes data packets between the E-UTRAN 1510 and the EPC network 1520. In addition, the S-GW 1522 may be a local mobility anchor point for inter-RAN node handovers and also may provide an anchor for inter-3GPP mobility. Other responsibilities may include lawful intercept, charging, and some policy enforcement.

The P-GW 1523 may terminate an SGi interface toward a PDN. The P-GW 1523 may route data packets between the EPC network 1523 and external networks such as a network including the application server 1530 (alternatively referred to as application function (AF)) via an Internet Protocol (IP) interface 1525. Generally, the application server 1530 may be an element offering applications that use IP bearer resources with the core network (e.g., UMTS Packet Services (PS) domain, LTE PS data services, etc.). In this embodiment, the P-GW 1523 is shown to be communicatively coupled to an application server 1530 via an IP communications interface 1525. The application server 1530 can also be configured to support one or more communication services (e.g., Voice-over-Internet Protocol (VoIP) sessions, PTT sessions, group communication sessions, social networking services, etc.) for the UEs 1501 and 1502 via the EPC network 1520.

The P-GW 1523 may further be a node for policy enforcement and charging data collection. Policy and Charging Enforcement Function (PCRF) 1526 is the policy and charging control element of the EPC network 1520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1526 may be communicatively coupled to the application server 1530 via the P-GW 1523. The application server 1530 may signal the PCRF 1526 to indicate a new service flow and select the appropriate Quality of Service (QoS) and charging parameters. The PCRF 1526 may provision this rule into a Policy and Charging Enforcement Function (PCEF) (not shown) with the appropriate traffic flow template (TFT) and QoS class of identifier (QCI), which commences the QoS and charging as specified by the application server 1530.

Figure 16:
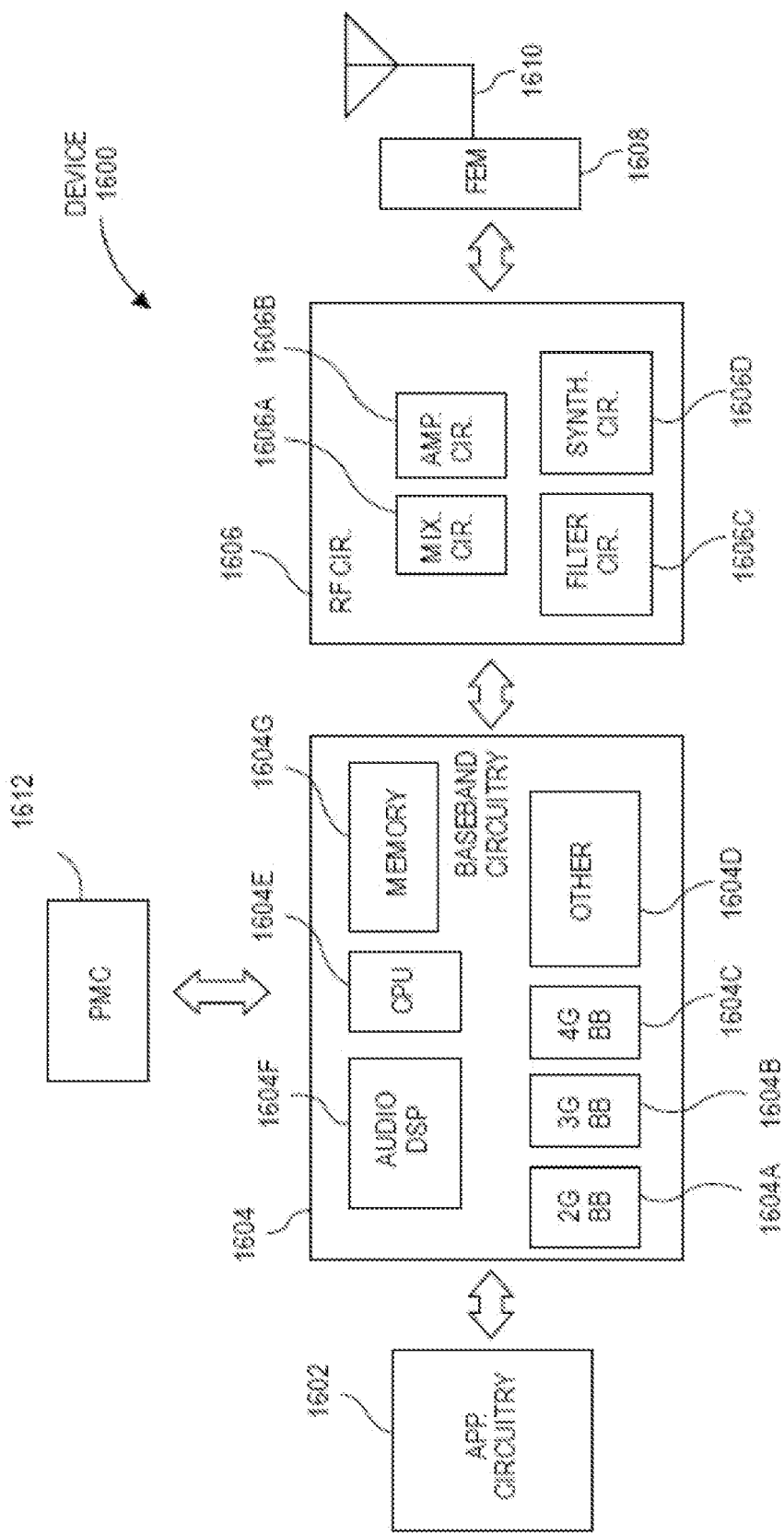
FIG. 16 illustrates a block diagram of an implementation for gNB and/or UEs, in accordance with various embodiments.

FIG. 16 illustrates a block diagram of an implementation for gNB and/or UEs, in accordance with various embodiments. In some embodiments, the device 1600 may include application circuitry 1602, baseband circuitry 1604, Radio Frequency (RF) circuitry 1606, front-end module (FEM) circuitry 1608, one or more antennas 1610, and power management circuitry (PMC) 1612 coupled together at least as shown. The components of the illustrated device 1600 may be included in a UE or a RAN node. In some embodiments, the device 1600 may include less elements (e.g., a RAN node may not utilize application circuitry 1602, and instead include a processor/controller to process IP data received from an EPC). In some embodiments, the device 1600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1600. In some embodiments, processors of application circuitry 1602 may process IP data packets received from an EPC.

The baseband circuitry 1604 may include circuitry such as, but not limited to, one or more single-core or multi-core processors. The baseband circuitry 1604 may include one or more baseband processors or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a third generation (3G) baseband processor 1604A, a fourth generation (4G) baseband processor 1604B, a fifth generation (5G) baseband processor 1604C, or other baseband processor(s) 1604D for other existing generations, generations in development or to be developed in the future (e.g., second generation (2G), sixth generation (6G), etc.). The baseband circuitry 1604 (e.g., one or more of baseband processors 1604A-D) may handle various radio control functions that enable communication with one or more radio networks via the RF circuitry 1606. In other embodiments, some or all of the functionality of baseband processors 1604A-D may be included in modules stored in the memory 1604G and executed via a Central Processing Unit (CPU) 1604E. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, or constellation mapping/demapping functionality. In some embodiments, encoding/decoding circuitry of the baseband circuitry 1604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include one or more audio digital signal processor(s) (DSP) 1604F. The audio DSP(s) 1604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the receive signal path of the RF circuitry 1606 may include mixer circuitry 1606a, amplifier circuitry 1606b and filter circuitry 1606c. In some embodiments, the transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c.

In some embodiments, the mixer circuitry 1606a of the receive signal path and the mixer circuitry 1606a of the transmit signal path may include two or more mixers and may be arranged for quadrature downconversion and upconversion, respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610. In various embodiments, the amplification through the transmit or receive signal paths may be done solely in the RF circuitry 1606, solely in the FEM 1608, or in both the RF circuitry 1606 and the FEM 1608.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610).

In some embodiments, the PMC 1612 may manage power provided to the baseband circuitry 1604. In particular, the PMC 1612 may control power-source selection, voltage scaling, battery charging, or DC-to-DC conversion. The PMC 1612 may often be included when the device 1600 is capable of being powered by a battery, for example, when the device is included in a UE. The PMC 1612 may increase the power conversion efficiency while providing desirable implementation size and heat dissipation characteristics.

While FIG. 16 shows the PMC 1612 coupled only with the baseband circuitry 1604. However, in other embodiments, the PMC 16 12 may be additionally or alternatively coupled with, and perform similar power management operations for, other components such as, but not limited to, application circuitry 1602, RF circuitry 1606, or FEM 1608.

In some embodiments, the PMC 1612 may control, or otherwise be part of, various power saving mechanisms of the device 1600. For example, if the device 1600 is in an RRC_Connected state, where it is still connected to the RAN node as it expects to receive traffic shortly, then it may enter a state known as Discontinuous Reception Mode (DRX) after a period of inactivity. During this state, the device 1600 may power down for brief intervals of time and thus save power.

If there is no data traffic activity for an extended period of time, then the device 1600 may transition off to an RRC_Idle state, where it disconnects from the network and does not perform operations such as channel quality feedback, handover, etc. The device 1600 goes into a very low power state and it performs paging where again it periodically wakes up to listen to the network and then powers down again. The device 1600 may not receive data in this state, in order to receive data, it may transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1602 and processors of the baseband circuitry 1604 may be used to execute elements of one or more instances of a protocol stack. For example, processors of the baseband circuitry 1604, alone or in combination, may be used execute Layer 3, Layer 2, or Layer 1 functionality, while processors of the application circuitry 1604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 17:
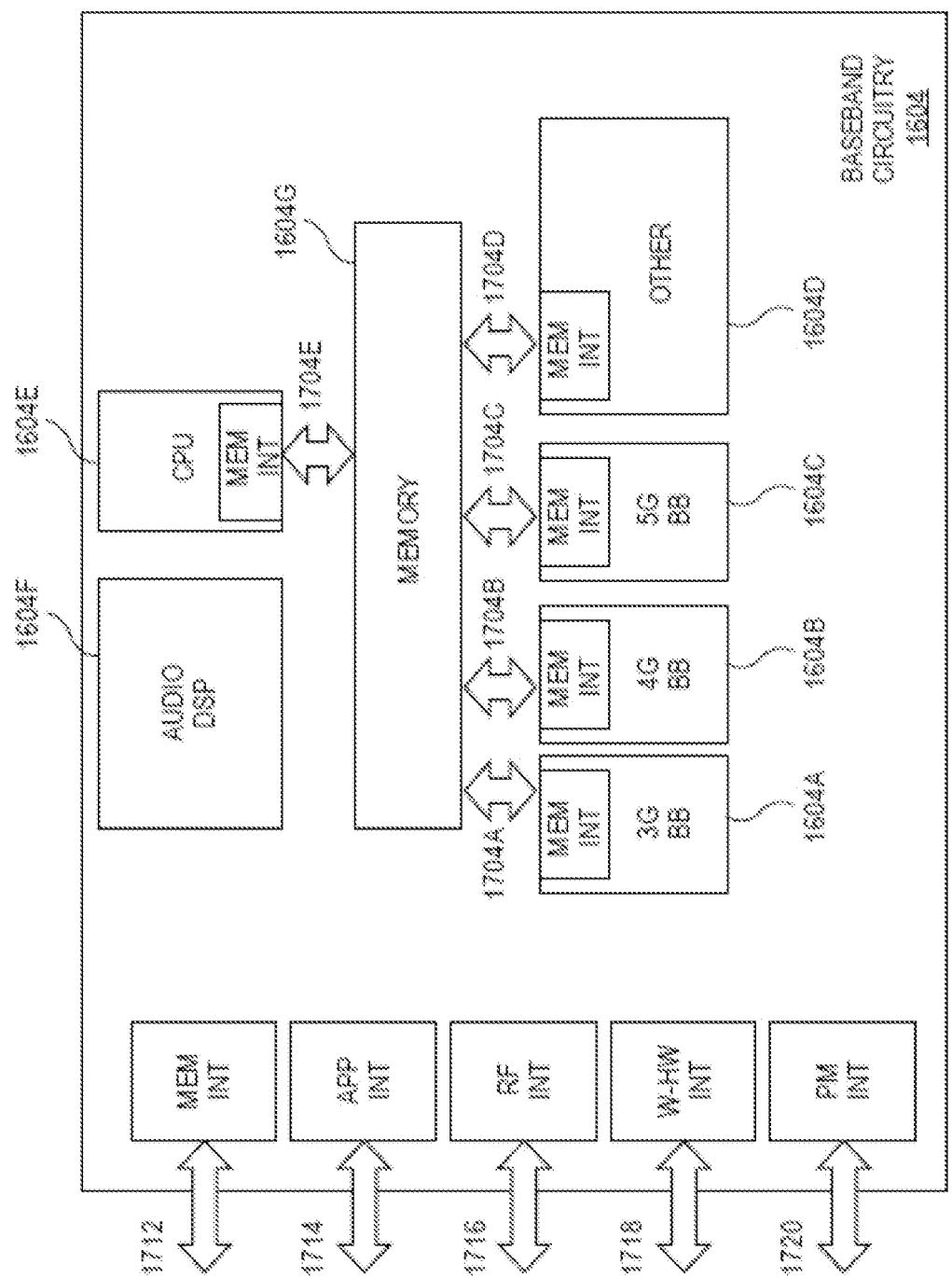
FIG. 17 illustrates interfaces of baseband circuitry as a part of an implementation for gNBs and/or UEs, in accordance with various embodiments.

FIG. 17 illustrates interfaces of baseband circuitry as a part of an implementation for gNBs and/or UEs, in accordance with various embodiments. As discussed above, the baseband circuitry 1604 of FIG. 16 may comprise processors 1604A-1604E and a memory 1604G utilized by said processors. Each of the processors 1604A-1604E may include a memory interface, 1704A-1704E, respectively, to send/receive data to/from the memory 1604G.

The baseband circuitry 1604 may further include one or more interfaces to communicatively couple to other circuitries/devices, such as a memory interface 1712 (e.g., an interface to send/receive data to/from memory external to the baseband circuitry 1604), an application circuitry interface 1714 (e.g., an interface to send/receive data to/from the application circuitry 1602 of FIG. 16), an RF circuitry interface 1716 (e.g., an interface to send/receive data to/from RF circuitry 1606 of FIG. 16), a wireless hardware connectivity interface 1718 (e.g., an interface to send/receive data to/from Near Field Communication (NFC) components, Bluetooth® components (e.g., Bluetooth® Low Energy), Wi-Fi® components, and other communication components), and a power management interface 1720 (e.g., an interface to send/receive power or control signals to/from the PMC 1612.

Figure 18:
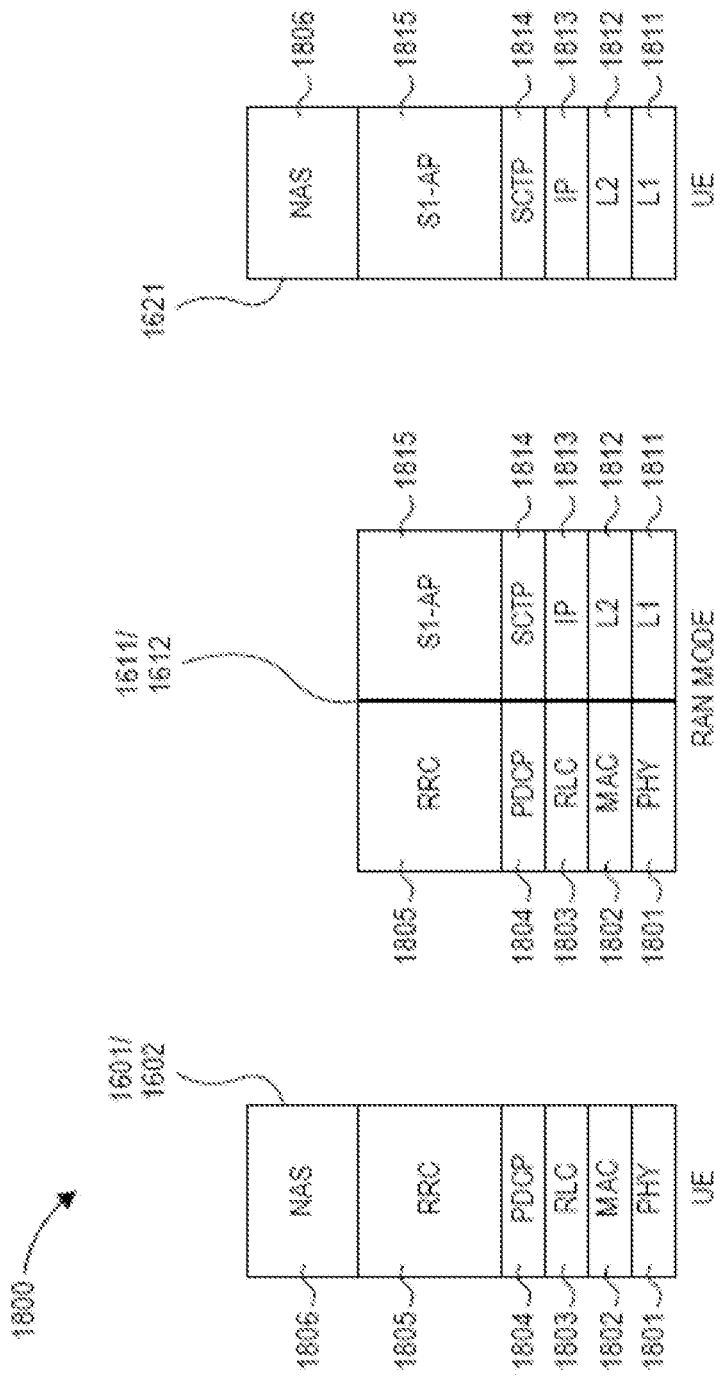
FIG. 18 illustrates an example control plane protocol stack, in accordance with various embodiments.

FIG. 18 illustrates an example control plane protocol stack, in accordance with various embodiments. In this embodiment, a control plane 1800 is shown as a communications protocol stack between the UE 1501 (or alternatively, the UE 1502), the RAN node 1511 (or alternatively, the RAN node 1512), and the MME 1521.

The PHY layer 1801 may transmit or receive information used by the MAC layer 1802 over one or more air interfaces. The PHY layer 1801 may further perform link adaptation or adaptive modulation and coding (AMC), power control, cell search (e.g., for initial synchronization and handover purposes), and other measurements used by higher layers, such as the RRC layer 1805. The PHY layer 1801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1803 may operate in a plurality of modes of operation, including: Transparent Mode (TM), Unacknowledged Mode (UM), and Acknowledged Mode (AM). The RLC layer 1803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1501 and the RAN node 1511 may utilize a Uu interface (e.g., an LTE-Uu interface) to exchange control plane data via a protocol stack comprising the PHY layer 1801, the MAC layer 1802, the RLC layer 1803, the PDCP layer 1804, and the RRC layer 1805.

The non-access stratum (NAS) protocols 1806 form the highest stratum of the control plane between the UE 1501 and the MME 1521. The NAS protocols 1806 support the mobility of the UE 1501 and the session management procedures to establish and maintain IP connectivity between the UE 1501 and the P-GW 1523.

The S1 Application Protocol (S1-AP) layer 1815 may support the functions of the S1 interface and comprise Elementary Procedures (EPs). An EP is a unit of interaction between the RAN node 1511 and the EPC 1520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1814 may ensure reliable delivery of signaling messages between the RAN node 1511 and the MME 1521 based, in part, on the IP protocol, supported by the IP layer 1813. The L2 layer 1812 and the L1 layer 1811 may refer to communication links (e.g., wired or wireless) used by the RAN node and the MME to exchange information.

The RAN node 1511 and the MME 1521 may utilize an S1-MME interface to exchange control plane data via a protocol stack comprising the L1 layer 1811, the L2 layer 1812, the IP layer 1813, the SCTP layer 1814, and the S1-AP layer 1815.

Figure 19:
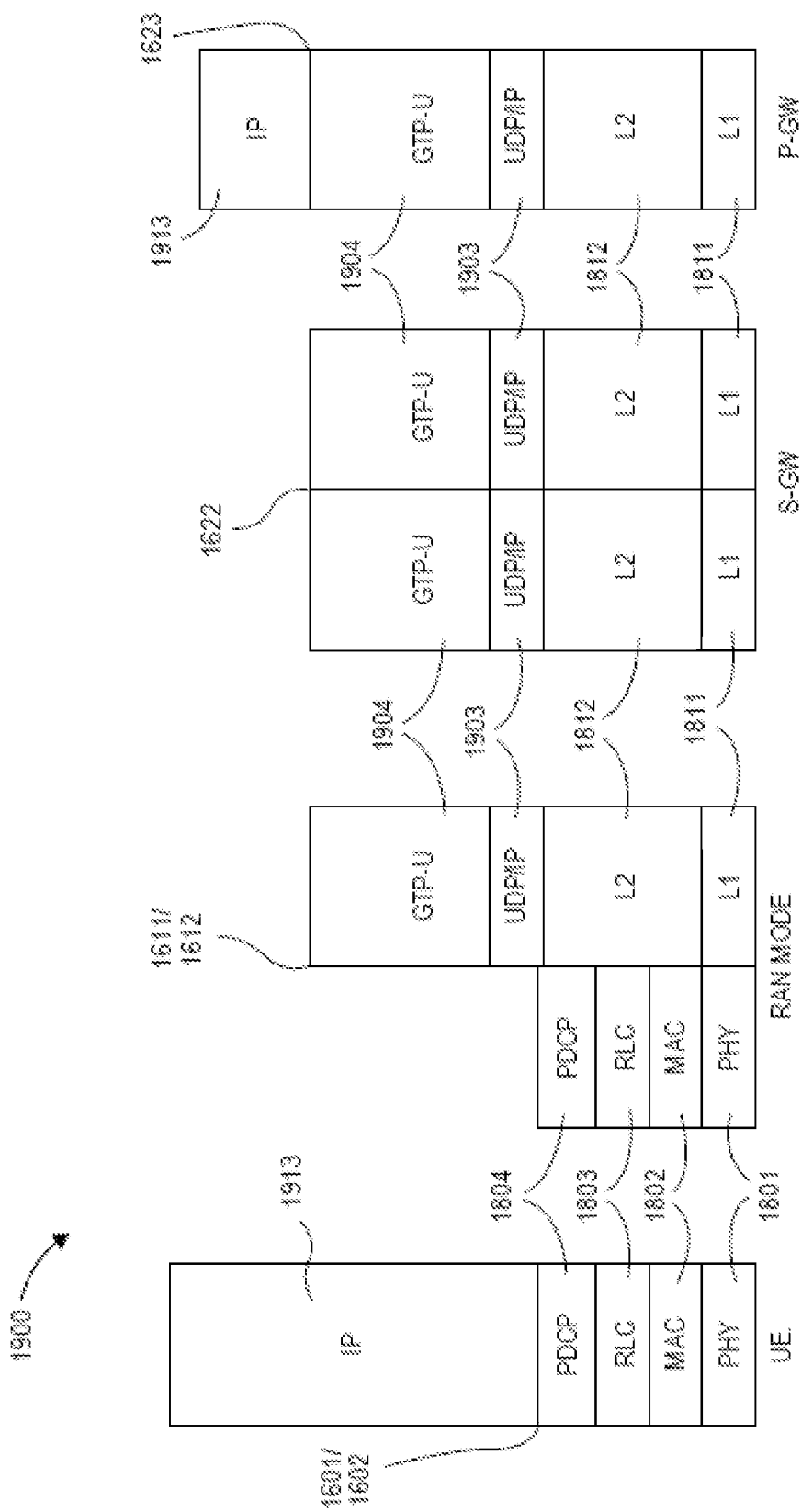
FIG. 19 illustrates an example user plane protocol stack, in accordance with various embodiments.

FIG. 19 illustrates an example user plane protocol stack, in accordance with various embodiments. In this embodiment, a user plane 1900 is shown as a communications protocol stack between the UE 1501 (or alternatively, the UE 1502), the RAN node 1511 (or alternatively, the RAN node 1512), the S-GW 1522, and the P-GW 1523. The user plane 1900 may utilize at least some of the same protocol layers as the control plane 1800. For example, the UE 1501 and the RAN node 1511 may utilize a Uu interface (e.g., an LTE-Uu interface) to exchange user plane data via a protocol stack comprising the PHY layer 1801, the MAC layer 1802, the RLC layer 1803, the PDCP layer 1804.

The General Packet Radio Service (GPRS) Tunneling Protocol for the user plane (GTP-U) layer 1904 may be used for carrying user data within the GPRS core network and between the radio access network and the core network. The user data transported can be packets in any of IPv4, IPv6, or PPP formats, for example. The UDP and IP security (UDP/IP) layer 1903 may provide checksums for data integrity, port numbers for addressing different functions at the source and destination, and encryption and authentication on the selected data flows. The RAN node 1511 and the S-GW 1522 may utilize an S1-U interface to exchange user plane data via a protocol stack comprising the L1 layer 1811, the L2 layer 1812, the UDP/IP layer 1903, and the GTP-U layer 1904. The S-GW 1522 and the P-GW 1523 may utilize an S5/S8a interface to exchange user plane data via a protocol stack comprising the L1 layer 1811, the L2 layer 1812, the UDP/IP layer 1903, and the GTP-U layer 1904. As discussed above with respect to FIG. 18, NAS protocols support the mobility of the UE 1501 and the session management procedures to establish and maintain IP connectivity between the UE 1501 and the P-GW 1523.

Figure 20:
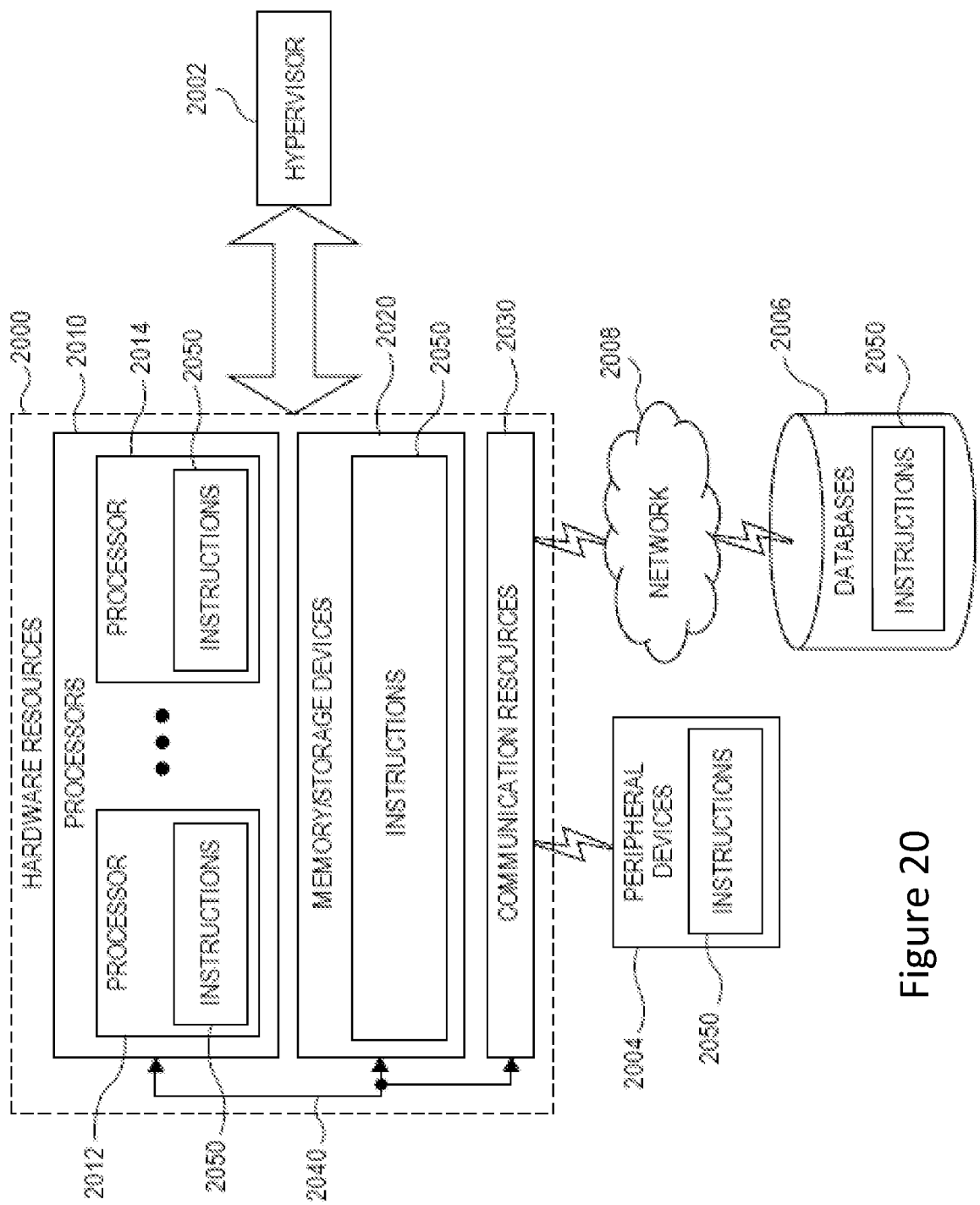
FIG. 20 illustrates a block diagram illustrating components able to read instructions from a machine-readable or computer-readable medium and perform any one or more of the methodologies discussed herein, in accordance with various embodiments.

FIG. 20 illustrates a block diagram illustrating components able to read instructions from a machine-readable or computer-readable medium and perform any one or more of the methodologies discussed herein, in accordance with various embodiments.

Specifically, FIG. 20 shows a diagrammatic representation of hardware resources 2000 including one or more processors (or processor cores) 2010, one or more memory/storage devices 2020, and one or more communication resources 2030, each of which may be communicatively coupled via a bus 2040. For embodiments where node virtualization (e.g., NFV) is utilized, a hypervisor 2002 may be executed to provide an execution environment for one or more network slices/sub-slices to utilize the hardware resources 2000.

The processors 2010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2012 and a processor 2014.

The memory/storage devices 2020 may include main memory, disk storage, or any suitable combination thereof. The memory/storage devices 2020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2030 may include interconnection or network interface components or other suitable devices to communicate with one or more peripheral devices 2004 or one or more databases 2006 via a network 2008. For example, the communication resources 2030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2050 may comprise software, a program, an application, an applet, an app, or other executable code for causing at least any of the processors 2010 to perform any one or more of the methodologies discussed herein. The instructions 2050 may reside, completely or partially, within at least one of the processors 2010 (e.g., within the processor's cache memory), the memory/storage devices 2020, or any suitable combination thereof. Furthermore, any portion of the instructions 2050 may be transferred to the hardware resources 2000 from any combination of the peripheral devices 2004 or the databases 2006. Accordingly, the memory of processors 2010, the memory/storage devices 2020, the peripheral devices 2004, and the databases 2006 are examples of computer-readable and machine-readable media.

In embodiments, one or more elements of FIGS. 15-20 may be configured to perform one or more processes, techniques, or methods as described herein, or portions thereof, e.g., processes shown in FIGS. 5-7. For example, the one or more elements of FIGS. 15-20 may be configured to perform operations such as transmitting, by PSS/SSS, coarse time and frequency synchronization information to a UE; transmitting a first system information and a second system information to the UE; receiving a PRACH from the UE to trigger a transmission of a TRS to the UE; and transmitting the TRS to the UE. Additionally, the one or more elements of FIGS. 15-20 may be configured to perform operations such as causing coarse time and frequency synchronization information, obtained from PSS/SSS, to be stored in the memory; decoding, based on the coarse time and frequency synchronization information stored in the memory, a physical broadcast channel to obtain a first system information; acquiring, based on the first system information, a second system information; causing transmission of a PRACH, based on the first and second system information, to trigger a transmission of a TRS by the gNB. In embodiments, one or more elements of FIGS. 15-20 may be configured to perform one or more processes, techniques, or methods, or portions thereof, as described in the following examples.

EXAMPLES

Example 1 may include an apparatus to be used in a user equipment (UE) in a mobile communication network to communicate with a next generation Node B (gNB), the apparatus comprising: a memory; and processing circuitry, coupled with the memory, the processing circuitry to: cause coarse time and frequency synchronization information, obtained from primary and secondary synchronization signals (PSS/SSS), to be stored in the memory; decode, based on the coarse time and frequency synchronization information stored in the memory, a physical broadcast channel to obtain a first system information; acquire, based on the first system information, a second system information; and cause transmission of a physical random access channel (PRACH), based on the first and second system information, to trigger a transmission of a tracking reference signal (TRS) by the gNB.

Example 2 may include the apparatus of example 1 and/or some other examples herein, wherein the first system information is to be included in a master information block (MIB) and the second system information is to be included in one or more system information blocks (SIBs).

Example 3 may include the apparatus of example 1 and/or some other examples herein, wherein the first system information is minimum system information (MSI) and the second system information is remaining minimum system information (RMSI) or other system information (OSI).

Example 4 may include the apparatus of any one of examples 1-3 and/or some other examples herein, wherein the processing circuitry is further to: obtain downlink control information (DCI) carried by physical downlink control channel (PDCCH), to schedule physical downlink shared channel (PDSCH) that is to carry the system information.

Example 5 may include the apparatus of any one of examples 1-3 and/or some other examples herein, wherein the processing circuitry is further to: identify the TRS from the gNB; and perform, based on the TRS, fine time and frequency synchronization with the gNB, wherein the fine time and frequency synchronization is more accurate than the coarse time and frequency synchronization information.

Example 6 may include the apparatus of example 5 and/or some other examples herein, wherein the processing circuitry is further to: estimate, based on the TRS, a set of quasi-co-location (QCL) parameters of a channel between the gNB and the UE.

Example 7 may include the apparatus of any one of examples 1-3 and/or some other examples herein, wherein the first and second system information and the TRS are to be received over a same bandwidth.

Example 8 may include the apparatus of example 7 and/or some other examples herein, wherein the same bandwidth comprises a same number of physical resource blocks (PRBs) over which the PSS/SSS are transmitted when the gNB is in an energy-savings mode.

Example 9 may include the apparatus of any one of examples 1-3 and/or some other examples herein, wherein the processing circuitry is further to: determine, based the first and second system information, a configuration of cell-specific bandwidth over which the TRS is to be received.

Example 10 may include the apparatus of any one of examples 1-3 and/or some other examples herein, wherein the first and second system information is to be received over a first bandwidth and the TRS is to be received over a second bandwidth that is larger than the first bandwidth.

Example 11 may include the apparatus of any one of examples 1-3 and/or some other examples herein, wherein the TRS is received over a UE-specific bandwidth configured by radio resource control (RRC) signaling after RRC connection setup.

Example 12 may include the apparatus of any one of examples 1-3 and/or some other examples herein, wherein the transmission of the PRACH is to trigger periodic transmissions of the TRS by the gNB.

Example 13 may include the apparatus of any one of examples 1-3 and/or some other examples herein, wherein the TRS is received in a downlink slot in a time division duplex (TDD) system, and wherein the slot is defined by a mathematical formula, or by interleaved orthogonal frequency-division multiple Access (OFDMA) signal structure.

Example 14 may include the apparatus of any one of examples 1-3 and/or some other examples herein, wherein the TRS is a first TRS, and the processing circuitry is further to identify a second TRS for a paging message from the gNB that is sent independent from the transmission of the PRACH.

Example 15 may include the apparatus of example 14 and/or some other examples herein, wherein the second TRS for the paging message is received in a same system bandwidth over which the first and second system information is received, or in a configurable cell-specific bandwidth or UE specific bandwidth.

Example 16 may include the apparatus of example 14 and/or some other examples herein, wherein the second TRS for the paging message is received periodically in a fixed specified narrowband bandwidth.

Example 17 may include a computer-readable medium comprising instructions to cause a next generation Node B (gNB), upon execution of the instructions by one or more processors, to: transmit, by primary and secondary synchronization signals (PSS/SSS), coarse time and frequency synchronization information to a user equipment (UE); transmit a first system information and a second system information to the UE; and receive a physical random access channel (PRACH) from the UE to trigger a transmission of a tracking reference signal (TRS) to the UE; and transmit the TRS to the UE.

Example 18 may include the computer-readable medium of example 17 and/or some other examples herein, wherein the TRS is transmitted periodically after receiving the PRACH from the UE.

Example 19 may include the computer-readable medium of example 17 and/or some other examples herein, wherein the TRS is a first TRS, and the instructions upon execution by one or more processors, is further to cause the gNB to: transmit a second TRS for a paging message to the UE, where the second TRS is transmitted independently from the PRACH received from the UE.

Example 20 may include the computer-readable medium of any one of examples 17-19 and/or some other examples herein, wherein the first system information is minimum system information (MSI) and the second system information is remaining minimum system information (RMSI) or other system information (OSI).

Example 21 may include the computer-readable medium of any one of examples 17-19 and/or some other examples herein, wherein the first and second system information and the TRS are transmitted over a same bandwidth.

Example 22 may include the computer-readable medium of any one of examples 17-19 and/or some other examples herein, wherein the first and second system information is to be transmitted over a first bandwidth and the TRS is to be transmitted over a second bandwidth that is larger than the first bandwidth.

Example 23 may include an apparatus to be used in a user equipment (UE) in a mobile communication network to communicate with a next generation Node B (gNB), comprising: means for obtaining, from primary and secondary synchronization signals (PSS/SSS), coarse time and frequency synchronization information; means for decoding, based on the coarse time and frequency synchronization information, a physical broadcast channel to obtain a master system information (MSI); means for acquiring, based on the MSI, one or more remaining minimum system information (RMSI) or other system information (OSI); and means for causing transmission of a physical random access channel (PRACH), based on the MSI and the one or more RMSI and OSIs, to trigger a transmission of a tracking reference signal (TRS) by the gNB.

Example 24 may include the apparatus of example 23 and/or some other examples herein, wherein the TRS is a first TRS, and the apparatus further comprising: means for identifying a second TRS for a paging message from the gNB.

Example 25 may include the apparatus of any one of examples 23-24 and/or some other examples herein, wherein the transmission of the PRACH is to trigger periodic transmissions of the TRS by the gNB.

Example 26 may include a method for a next generation Node B (gNB) in a mobile communication network to communicate with a user equipment (UE), the method comprising: transmitting, by primary and secondary synchronization signals (PSS/SSS), coarse time and frequency synchronization information to the UE; transmitting a first system information and a second system information to the UE; receiving a physical random access channel (PRACH) from the UE to trigger a transmission of a tracking reference signal (TRS) to the UE; and transmitting the TRS to the UE.

Example 27 may include the method of example 26 and/or some other examples herein, wherein the TRS is transmitted periodically after receiving the PRACH from the UE.

Example 28 may include the method of example 26 and/or some other examples herein, wherein the TRS is a first TRS, and the method further comprising: transmitting a second TRS for a paging message to the UE, where the second TRS is transmitted independently from the PRACH received from the UE.

Example 29 may include the method of any one of examples 26-28 and/or some other examples herein, wherein the first system information is minimum system information (MSI) and the second system information is remaining minimum system information (RMSI) or other system information (OSI).

Example 30 may include the method of any one of examples 26-28 and/or some other examples herein, wherein the first and second system information and the TRS are transmitted over a same bandwidth.

Example 31 may include the method of any one of examples 26-28 and/or some other examples herein, wherein the first and second system information is to be transmitted over a first bandwidth and the TRS is to be transmitted over a second bandwidth that is larger than the first bandwidth.

Example 32 may include one or more computer-readable media having instructions for a next generation Node B (gNB) in a mobile communication network to communicate with a user equipment (UE), upon execution of the instructions by one or more processors, to perform the method of any one of examples 26-31.

Example 33 may include a method comprising: transmitting, by a base station transceiver, a tracking reference signal in a fixed narrowband bandwidth; transmitting, by the base station transceiver, system information with the same bandwidth as the tracking reference signal; receiving, by the base station transceiver, a random access transmission from a user equipment; establishing, by the base station transceiver, a bidirectional communication link with said user equipment encompassing the configuration of a transmission bandwidth for the tracking reference signal; and communicating, by the base station transceiver, with said user equipment over a dedicated transmission bandwidth after the bidirectional communication link has been established.

Example 34 may include a method comprising, transmitting, by a base station transceiver, system information over a configured bandwidth; transmitting, by the base station transceiver, a tracking reference signal with the same bandwidth as the system information transmissions; receiving, by the base station transceiver, a random access transmission from a user equipment; establishing, by the base station transceiver, a bidirectional communication link with said user equipment; and communicating, by the base station transceiver, with said user equipment over a dedicated transmission bandwidth after the bidirectional communication link has been established.

Example 35 may include a method comprising: transmitting, by a base station transceiver, a tracking reference signal in a fixed narrowband bandwidth; transmitting, by the base station transceiver, system information with the same bandwidth as the tracking reference signal; receiving, by the base station transceiver, a random access transmission from a user equipment; transmitting, by the base station transceiver, a tracking reference signal in an expanded transmission bandwidth signaled in the said system information; transmitting, by the base station transceiver, additional system information with the same bandwidth as the said expanded transmission bandwidth; establishing, by the base station transceiver, a bidirectional communication link with said user equipment; and communicating, by the base station transceiver, with said user equipment over a dedicated transmission bandwidth after the bidirectional communication link has been established.

Example 36 may include the method of example 33 and/or some other examples herein further comprising: rate-matching, by the base station transceiver, transmissions around time/frequency resources of the said configured transmission bandwidth for the tracking reference signal irrespective of whether all the reserved time/frequency resources are actually used for tracking reference signal transmissions.

Example 37 may include the method of example 34 and/or some other examples herein further comprising: rate-matching, by the base station transceiver, transmissions around time/frequency resources of the said configured transmission bandwidth for the tracking reference signal irrespective of whether all the reserved time/frequency resources are actually used for tracking reference signal transmissions.

Example 38 may include the method of example 35 and/or some other examples herein further comprising: rate-matching, by the base station transceiver, transmissions around time/frequency resources of the said configured transmission bandwidth for the tracking reference signal irrespective of whether all the reserved time/frequency resources are actually used for tracking reference signal transmissions.

Example 39 may include a method comprising: transmitting, by a base station transceiver, a tracking reference signal in a fixed narrowband bandwidth; transmitting, by the base station transceiver, paging information with the same bandwidth as the tracking reference signal; rate-matching, by the base station transceiver, transmissions around time/frequency resources of a configured transmission bandwidth for the tracking reference signal irrespective of whether all the reserved time/frequency resources are actually used for tracking reference signal transmissions.

Example 40 may include a method comprising, transmitting, by a base station transceiver, paging information over a configured bandwidth; transmitting, by the base station transceiver, a tracking reference signal with the same bandwidth as the paging information transmissions; and rate-matching, by the base station transceiver, transmissions around time/frequency resources of a configured transmission bandwidth for the tracking reference signal irrespective of whether all the reserved time/frequency resources are actually used for tracking reference signal transmissions.

Example 41 may include the method comprising: transmitting, by a base station transceiver, a tracking reference signal in a fixed narrowband bandwidth; transmitting, by the base station transceiver, a tracking reference signal in an expanded transmission bandwidth signaled in the system information whenever it has a paging message to transmit; and rate-matching, by the base station transceiver, transmissions around time/frequency resources of a configured transmission bandwidth for the tracking reference signal irrespective of whether all the reserved time/frequency resources are actually used for tracking reference signal transmissions.

Example 42 may include a method comprising: transmitting, by a base station transceiver, downlink control information to instruct user equipment whether to rate match downlink transmissions around configured time/frequency resources reserved for tracking reference signal transmissions.

Example 43 may include a method comprising: transmitting, by a base station transceiver, a tracking reference signal in a periodic manner; wherein the slots for the transmission of TRS are defined as the downlink slots or special slots in TDD system satisfying:

$$(10 \times n_f + [n_s/2] N_{OFFSET,TRS}) \bmod TRS_{PERIODICITY} = 0,$$

where $n_f$ and $n_s$ are radio frame number and slot number; $N_{OFFSET,TRS}$ and $TRS_{PERIODICITY}$ are the slot offset and periodicity of the TRS transmission.

Example 44 may include a method comprising: generating, by a base station transceiver, a tracking reference signal which follows the design principle for channel state information-reference symbol (CSI-RS) in the existing LTE specification.

Example 45 may include the method comprising: generating, by a base station transceiver, a tracking reference signal based on Zadoff-Chu(ZC) sequence, wherein a base sequence can be generated as a function of physical cell identity, or a virtual cell identity or slot/slot/frame index, and wherein a cyclic shift can be defined as a function of antenna port, physical or virtual cell identity and/or a cell-specific parameter.

Example 46 may include the method of example 45 and/or some other examples herein, further comprising: generating, by a base station transceiver, a repeated tracking reference signal structure based on a large subcarrier spacing.

Example 47 may include method of example 45 and/or some other examples herein, further comprising: generating, by a base station transceiver, a repeated tracking reference signal structure based on an interleaved FDMA (IFDMA) signal structure.

Example 48 may include the method of example 47 and/or some other examples herein, wherein different cell can select different comb offset for the IFDMA signal, which can be determined by the cell ID or virtual cell ID, or configured by higher layer signaling.

Example 49 may include the method of example 47 and/or some other examples herein, wherein the symbol/slot/slot index of the IFDMA signal can be determined by the cell ID or virtual cell ID.

Example 50 may include the method of example 33 and/or some other examples herein, wherein TRS transmission can be triggered aperiodically via DCI or MAC-CE;
wherein a set of configuration parameters for TRS transmission can be configured by higher layers via RRC signaling, while one field in the DCI can be used to indicate which configuration parameter from the set of configuration parameters is used for TRS transmission.

Example 51 may include the method of example 33 and/or some other examples herein, wherein the symbol gap between repeated CSI-RS transmissions can be predefined in the specification or configured by higher layers via system information block (SIB) or radio resource control (RRC) signaling.

Example 52 may include a base station transceiver to perform the method of any or more of examples 1-51.

Example 53 may include an apparatus comprising means to perform one or more elements of a method described in or related to any of examples 1-51, or any other method or process described herein.

Example 54 may include one or more non-transitory computer-readable media comprising instructions to cause an electronic device, upon execution of the instructions by one or more processors of the electronic device, to perform one or more elements of a method described in or related to any of examples 1-51, or any other method or process described herein.

Example 55 may include an apparatus comprising logic, modules, or circuitry to perform one or more elements of a method described in or related to any of examples 1-51, or any other method or process described herein.

Example 56 may include a method, technique, or process as described in or related to any of examples 1-51, or portions or parts thereof.

Example 57 may include an apparatus comprising: one or more processors and one or more computer readable media comprising instructions that, when executed by the one or more processors, cause the one or more processors to perform the method, techniques, or process as described in or related to any of examples 1-51, or portions thereof.

Example 58 may include a signal carrying or conveying data or information described in or related to any of examples 1-51, any other data or information discussed herein, and/or any portion thereof.

Example 59 may include a method of communicating in a wireless network as shown and described herein.

Example 60 may include a system for providing wireless communication as shown and described herein.

Example 61 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A user equipment (UE) in a mobile communication network to communicate with a base station (BS), the UE comprising:
a memory; and
processing circuitry, coupled with the memory, the processing circuitry configured to:
cause coarse time and frequency synchronization information, obtained from primary and secondary synchronization signals (PSS/SSS), to be stored in the memory;
decode, based on the coarse time and frequency synchronization information stored in the memory, a physical broadcast channel to obtain a first system information;
acquire, based on the first system information, a second system information;
cause transmission of a physical random access channel (PRACH), based on the first and second system information, to trigger a transmission of a first tracking reference signal (TRS) by the BS; and
receive a second TRS from the BS associated with a paging message, the second TRS sent independent from the transmission of the PRACH, wherein the second TRS for the paging message is received in a same system bandwidth over which the first and second system information is received, or in a configurable cell-specific bandwidth or a UE specific bandwidth.

2. The UE of claim 1, wherein the first system information is to be included in a master information block (MIB) and the second system information is to be included in one or more system information blocks (SIBs).

3. The UE of claim 1, wherein the first system information is minimum system information (MSI) and the second system information is remaining minimum system information (RMSI) or other system information (OSI).

4. The UE of claim 1, wherein the processing circuitry is further configured to:
obtain downlink control information (DCI) carried by a physical downlink control channel (PDCCH), to schedule physical downlink shared channel (PDSCH) that is to carry the system information; and
perform fine time synchronization and fine frequency synchronization based on the transmission of the first TRS by the BS.

5. The UE of claim 1, wherein the processing circuitry is further configured to:
identify the first TRS from the BS; and
perform, based on the first TRS, fine time and frequency synchronization with the BS, wherein the fine time and frequency synchronization is more accurate than the coarse time and frequency synchronization information.

6. The UE of claim 5, wherein the processing circuitry is further configured to:
estimate, based on the first TRS, a set of quasi-co-location (QCL) parameters of a channel between the BS and the UE.

7. The UE of claim 1, wherein the first and second system information and the first TRS are to be received over a same bandwidth.

8. The UE of claim 7, wherein the same bandwidth comprises a same number of physical resource blocks (PRBs) over which the PSS/SSS are transmitted when the BS is in an energy-savings mode.

9. The UE of claim 1, wherein the processing circuitry is further configured to:
determine, based on the first and second system information, a configuration of cell-specific bandwidth over which the first TRS is to be received.

10. The UE of claim 1, wherein the first and second system information is to be received over a first bandwidth and the first TRS is to be received over a second bandwidth that is larger than the first bandwidth.

11. The UE of claim 1, wherein the first TRS is received over a UE-specific bandwidth configured by radio resource control (RRC) signaling after RRC connection setup.

12. The UE of claim 1, wherein the transmission of the PRACH is to trigger periodic transmissions of the first TRS by the BS.

13. The UE of claim 1, wherein the first TRS is received in a downlink slot in a time division duplex (TDD) system, and wherein the downlink slot is defined by a mathematical formula, or by interleaved orthogonal frequency-division multiple Access (OFDMA) signal structure.

14. The UE of claim 1, wherein the processing circuitry is further configured to:
determine, based on the first and second system information, a configuration of a bandwidth over which the first TRS is to be received.

15. A non-transitory computer-readable medium comprising instructions to cause a base station (BS), upon execution of the instructions by one or more processors, to:
transmit, by primary and secondary synchronization signals (PSS/SSS), coarse time and frequency synchronization information to a user equipment (UE);
transmit a first system information and a second system information to the UE;
receive a physical random access channel (PRACH) from the UE to trigger a transmission of a first tracking reference signal (TRS) to the UE;
transmit the first TRS to the UE; and
transmit a second TRS to the UE associated with a paging message, wherein the second TRS is triggered in response to the paging message arriving in a buffer of the BS and is sent independent from the reception of the PRACH, and wherein the second TRS for the paging message is transmitted in a same system bandwidth over which the first and second system information is transmitted, or in a configurable cell-specific bandwidth or a UE specific bandwidth.

16. The non-transitory computer-readable medium of claim 15, wherein the first TRS is transmitted periodically after receiving the PRACH from the UE.

17. A method, comprising:
obtaining, by a user equipment (UE) and from primary and secondary synchronization signals (PSS/SSS), coarse time and frequency synchronization information;
decoding, by the UE and based on the coarse time and frequency synchronization information, a physical broadcast channel to obtain a master system information (MSI);
acquiring, by the UE and based on the MSI, one or more remaining minimum system information (RMSI) or other system information (OSI);
causing, by the UE, transmission of a physical random access channel (PRACH), based on the MSI and the one or more RMSI and OSIs, to trigger a transmission of a first tracking reference signal (TRS) by a base station (BS); and
receiving a second TRS from the BS associated with a paging message, the second TRS sent independent from the transmission of the PRACH, wherein the second TRS for the paging message is received periodically in a fixed specified narrowband bandwidth.

18. The method of claim 17, further comprising:
performing fine time synchronization and fine frequency synchronization based on the transmission of the first TRS by the BS.

* * * * *